US012638562B2

(12) United States Patent (10) Patent No.: US 12,638,562 B2
Hersman (45) Date of Patent: May 26, 2026

(54) SYSTEM AND TECHNIQUES FOR DISCOVERY AND TRACKING OF OBJECTS IN SPACE

(71) Applicant: Xemed LLC, Durham, NH (US)

(72) Inventor: F William Hersman, Durham, NH (US)

(73) Assignee: XEMED LLC, Durham, NH (US)

( * ) Notice: Subject to any disclaimer, the term of this patent is extended or adjusted under 35 U.S.C. 154(b) by 0 days.

(21) Appl. No.: 19/032,920

(22) Filed: Jan. 21, 2025

(65) Prior Publication Data
US 2025/0237750 A1 Jul. 24, 2025

Related U.S. Application Data

(60) Provisional application No. 63/622,916, filed on Jan. 19, 2024.

(51) Int. Cl.
*G01C 3/08* (2006.01)
*G01S 7/484* (2006.01)
(Continued)

(52) U.S. Cl.
CPC .............. *G01S 7/484* (2013.01); *G01S 7/499* (2013.01); *G01S 17/66* (2013.01); *G01S 17/88* (2013.01)

(58) Field of Classification Search
CPC .......... G01S 7/484; G01S 7/499; G01S 17/66; G01S 17/88
See application file for complete search history.

(56) References Cited

U.S. PATENT DOCUMENTS 8,853,604 B1 * 10/2014 Barchers ................ G01B 11/24
                                                          372/29.016
2017/0371106 A1 * 12/2017 Cruz .................. G02B 26/0841
(Continued)

FOREIGN PATENT DOCUMENTS

EP          2705350 B1 * 4/2017 ........... G01C 13/008

OTHER PUBLICATIONS

Yang, Jing et al. "Analysis of the hyperfine splitting spectral structure of rubidium atomic D1 and D2 lines with pressure broadening. " Science Direct. Optic, vol. 252, Feb. 2022, 168475. https://www.sciencedirect.com/science/article/pii/S0030402621019768 (Year: 2022).*
(Continued)

*Primary Examiner* — Samantha K Nickerson
(74) *Attorney, Agent, or Firm* — Hayes Soloway PC

(57) ABSTRACT

We present a ground-based laser system for searching, ranging, and tracking that actively illuminates small resident space objects (RSOs) in low Earth orbit (LEO) and observes position and transit-time of reflections, enabling orbital custody of most one-to-few centimeter-sized objects. A diode-pumped alkali laser (DPAL) augmented with mode-locking and Q-switching serves as an illuminator and offers exceptionally high spectral brightness due to its output beam's sub-nanosecond pulse duration and picometer-level spectral linewidth. Kilohertz fast-rastering enables interrogations of distinct few-meter-sized sky-patches at megahertz rates. Paired on the observation side with one or more telescopes outfitted with Faraday anomalous dispersion optical filters (FADOFs), image intensifiers, multi-pixel arrays, and nanosecond timing, the combined system could offer nearly background-free discoveries of RSOs every hour, even during daytime. Periodically re-flashing previously
(Continued)

Laser (Transmit light)
With at least one of:

High Power
(High sensitivity to small objects)

Wavelength centering (variable, for centering within an ultra-narrowband filter)

Linewidth
(Ultra-narrow for high signal-to-noise ratio)

Focus spot size (small preferred for high intensity and spatial definition, larger for searching, variable)

Motion of beam axis (Fast for large area searching with high spatiotemporal definition)

Micro-pulsing
(Short pulses for time-of-flight ranging)

Macro-pulsing
(for briefly boosting pump current amperage)

Polarization
(Further SNR, encoding, temporal disambiguation)

discovered objects to maintain orbit custody expends only a small fraction of total observing time.

18 Claims, 11 Drawing Sheets

(51) Int. Cl.

| | |
|---|---|
| *G01S 7/499* | (2006.01) |
| *G01S 17/66* | (2006.01) |
| *G01S 17/88* | (2006.01) |

(56) References Cited

U.S. PATENT DOCUMENTS

| | | | |
|---|---|---|---|
| 2023/0175885 A1* | 6/2023 | Qi ........................... | G01S 17/42 |
| | | | 250/216 |
| 2023/0184553 A1* | 6/2023 | Morrison .............. | G01R 33/26 |
| | | | 324/301 |
| 2023/0213628 A1* | 7/2023 | LaChapelle .......... | G01S 7/4816 |
| | | | 356/5.01 |

OTHER PUBLICATIONS

Yang (Year: 2022).*

Zhdanov, Boris V., et al. "Efficient potassium diode pumped alkali laser operating in pulsed mode." Optics Express, vol. 22, Issue 14, pp. 17266-17270. https://opg.optica.org/oe/fulltext.cfm?uri=OE-22-14-17266&id=295904 (Year: 2014).*

Pandey, Rajiv. "Narrow-line, tunable, high-power diode laser pump for DPAL applications." May 2013, Proceedings of SPIE—The International Society for Optical Engineering, DOI 10.1117/12.2014301. Conference: SPIE Defense, Security, and Sensing. (Year: 2013).*

Eileen K. Stansbery, NASA Orbital Debris Program Office, Astromaterials Research & Exploration Science, "Optical Measurements", 9 pages.

Brian Weeden, "Space Situational Awareness Fact Sheet", Secure World Foundation 2017, 4 pages.

"Haystack Ultrawideband Satellite Imaging Radar", R& D Area: Engineering; Space Systems and Technology, Lincoln Laboratory, 2024, 4 pages.

Donald J. Kessler et al., "Collision frequency of artificial satellites: The creation of a debris belt", Journal of Geophysical Research, Space Physics, AN AGU Journal, 1978, vol. 83, Issue A6, 10 pages.

Wagner et al., "SSA Technology Development Status for LEO Observations at the German Aerospace Center (DLR)", Advanced Maui Optical and Space Surveillance Technologies Conference (AMOS), German Aerospace Center (DLR), Institute of Technical Physics (TP), Active Optical Systems (AOS), Orbital Photonics Group (OPG), Pfaffenwaldring, 2022, pp. 38-40, 5 pages.

* cited by examiner

FIG. 1A

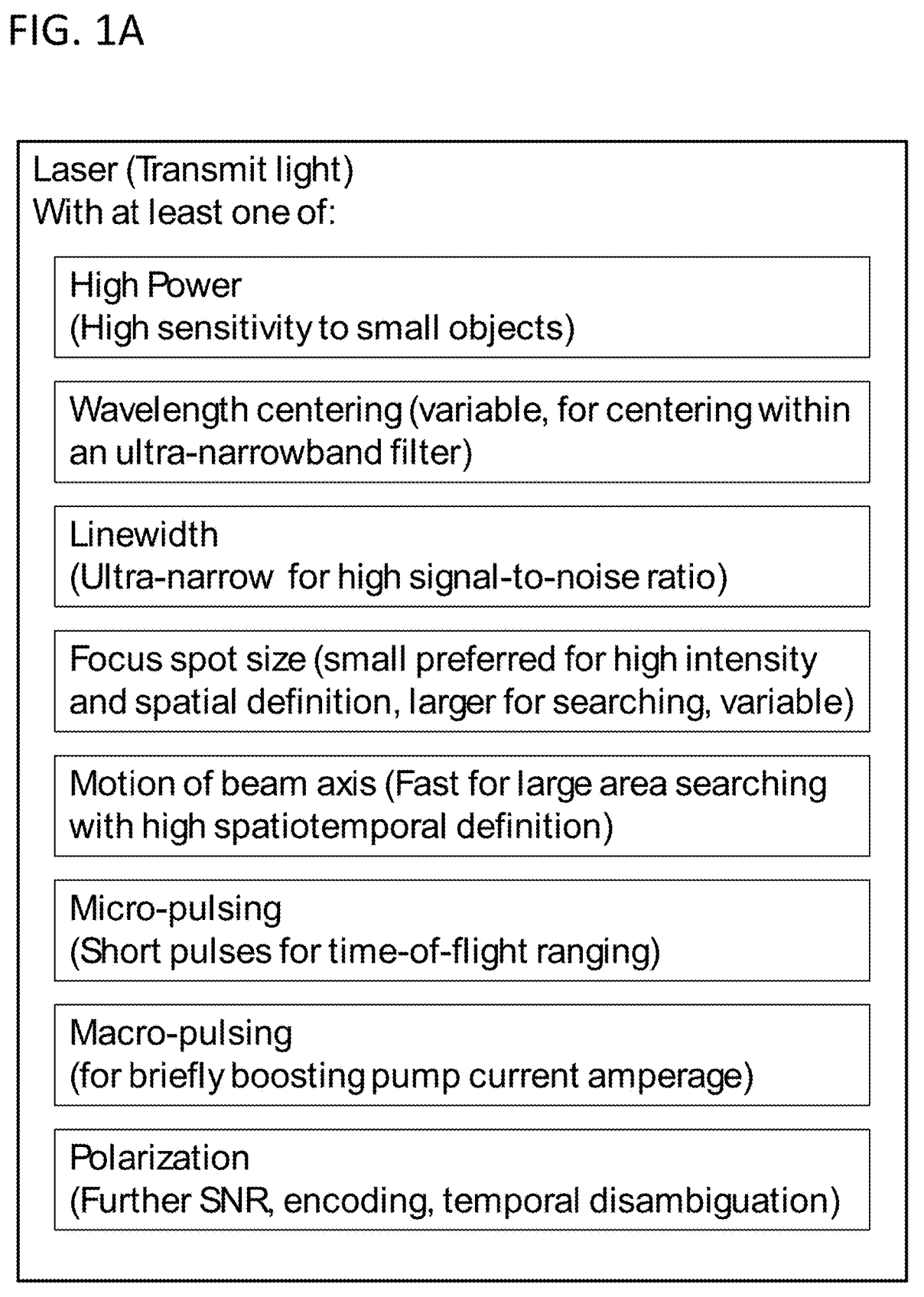

Laser (Transmit light)
With at least one of:

High Power
(High sensitivity to small objects)

Wavelength centering (variable, for centering within
an ultra-narrowband filter)

Linewidth
(Ultra-narrow for high signal-to-noise ratio)

Focus spot size (small preferred for high intensity
and spatial definition, larger for searching, variable)

Motion of beam axis (Fast for large area searching
with high spatiotemporal definition)

Micro-pulsing
(Short pulses for time-of-flight ranging)

Macro-pulsing
(for briefly boosting pump current amperage)

Polarization
(Further SNR, encoding, temporal disambiguation)

FIG. 1B

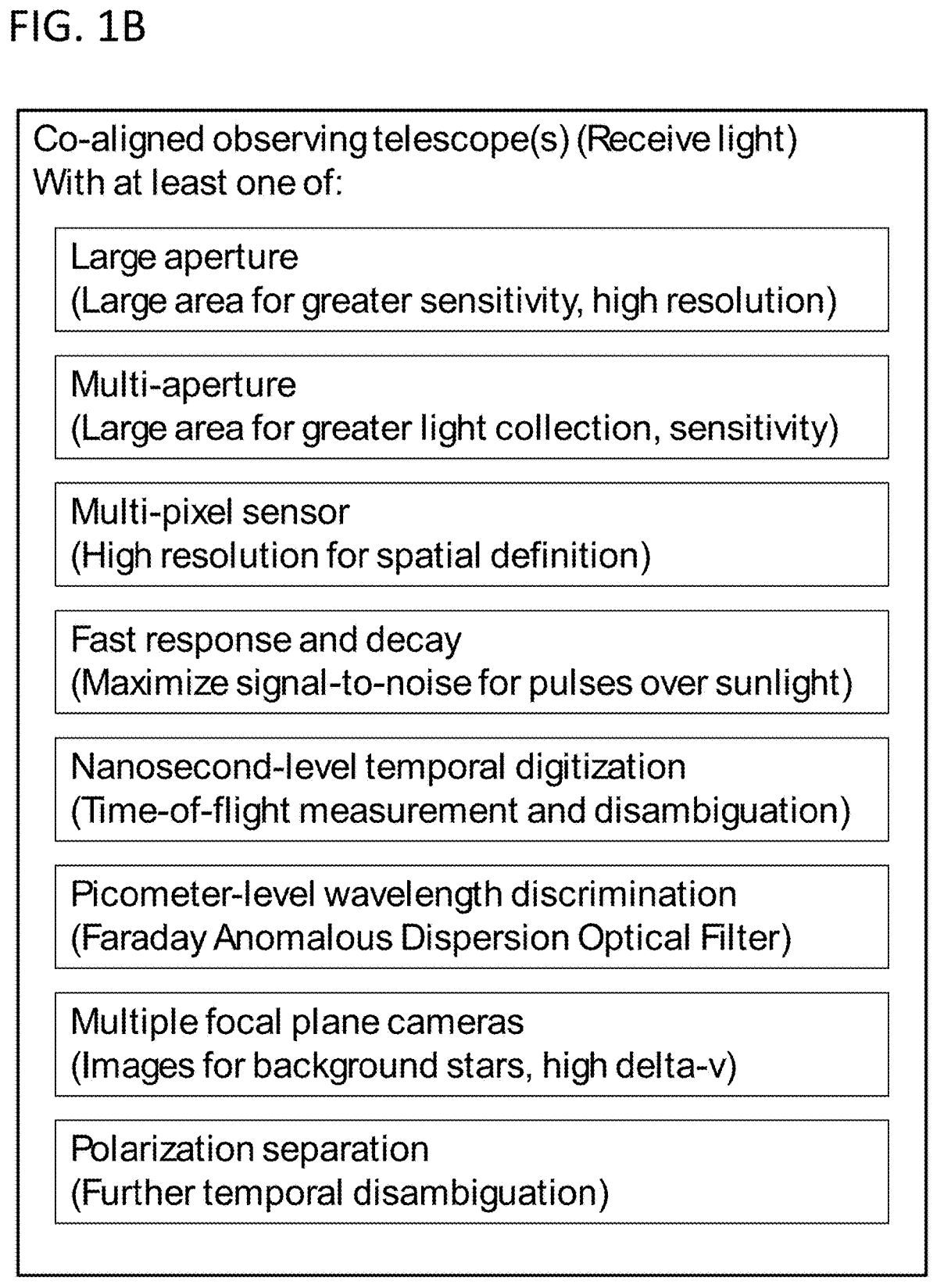

Co-aligned observing telescope(s) (Receive light)
With at least one of:

Large aperture
(Large area for greater sensitivity, high resolution)

Multi-aperture
(Large area for greater light collection, sensitivity)

Multi-pixel sensor
(High resolution for spatial definition)

Fast response and decay
(Maximize signal-to-noise for pulses over sunlight)

Nanosecond-level temporal digitization
(Time-of-flight measurement and disambiguation)

Picometer-level wavelength discrimination
(Faraday Anomalous Dispersion Optical Filter)

Multiple focal plane cameras
(Images for background stars, high delta-v)

Polarization separation
(Further temporal disambiguation)

200

100

Rear focusing mirrors 420

Family of beam paths 200

Amplifier region 100

Chicane Mirror

480 Output Coupler

Chicane Mirror

Output Chicane = Reinsertion chicane

Forward focusing mirrors 420

Output Beam

FIG. 6

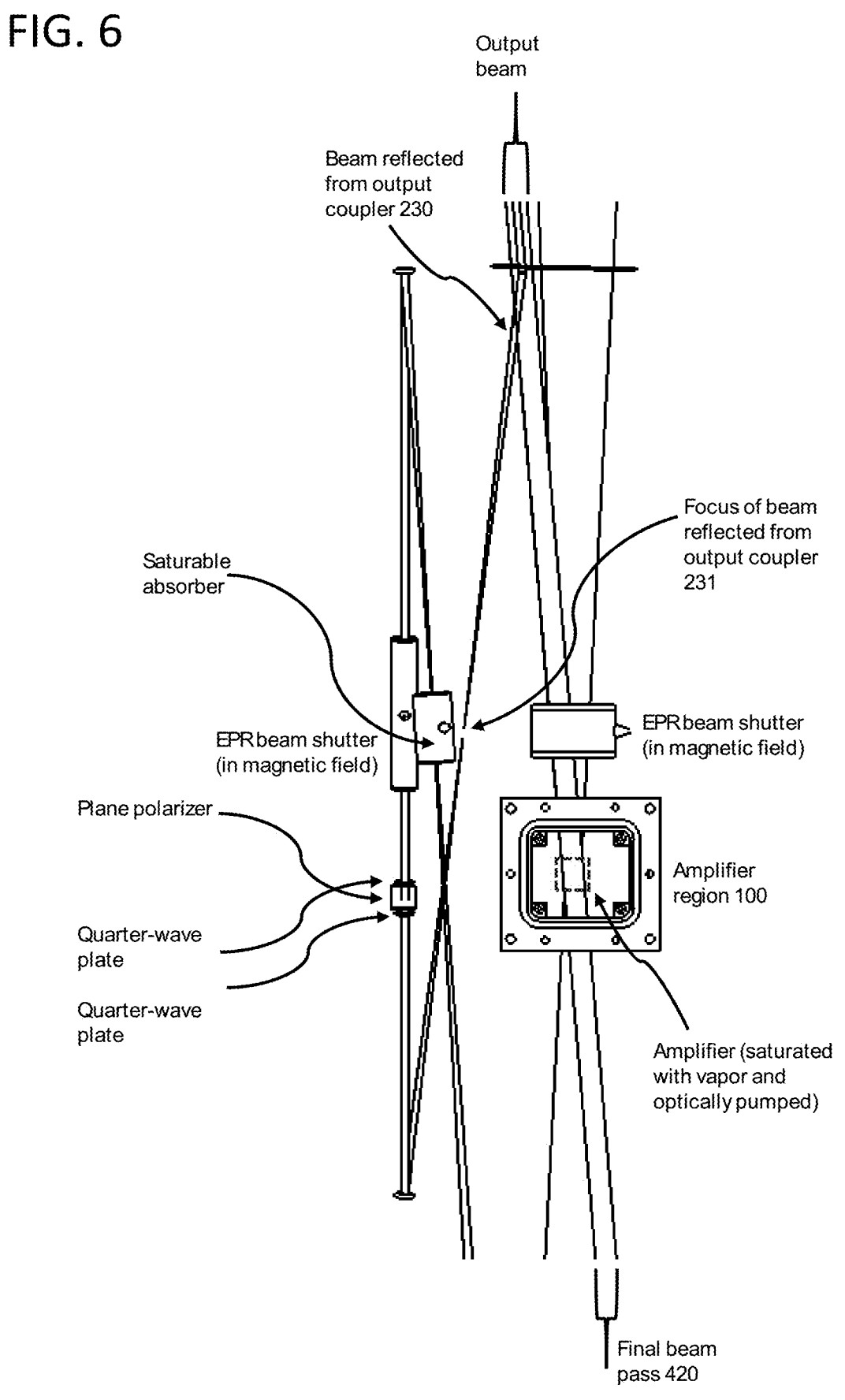

Output
beam

Beam reflected
from output
coupler 230

Focus of beam
reflected from
output coupler
231

Saturable
absorber

EPR beam shutter
(in magnetic field)

EPR beam shutter
(in magnetic field)

Plane polarizer

Amplifier
region 100

Quarter-wave
plate

Quarter-wave
plate

Amplifier (saturated
with vapor and
optically pumped)

Final beam
pass 420

Ocular element (off-axis paraboloid)

Focus actuator

Tip-Tilt Actuator 840

Fast motor spinning a canted mirror

Output beam to beam director telescope

Turning mirror of Coudé optical path

Fast motor 805 spinning a canted mirror

Fast motor 805 spinning a canted mirror

Output beam from laser 290

Canted rotating mirrors 810

Mean diameter 902
(determined by the
rotating mirror with the
larger cant angle )

Annulus width 903
(determined by the
rotating mirror with
the smaller cant
angle)

Annulus center 901
(determined by tip-
tilt actuator 840 and
other elements

FIG. 9

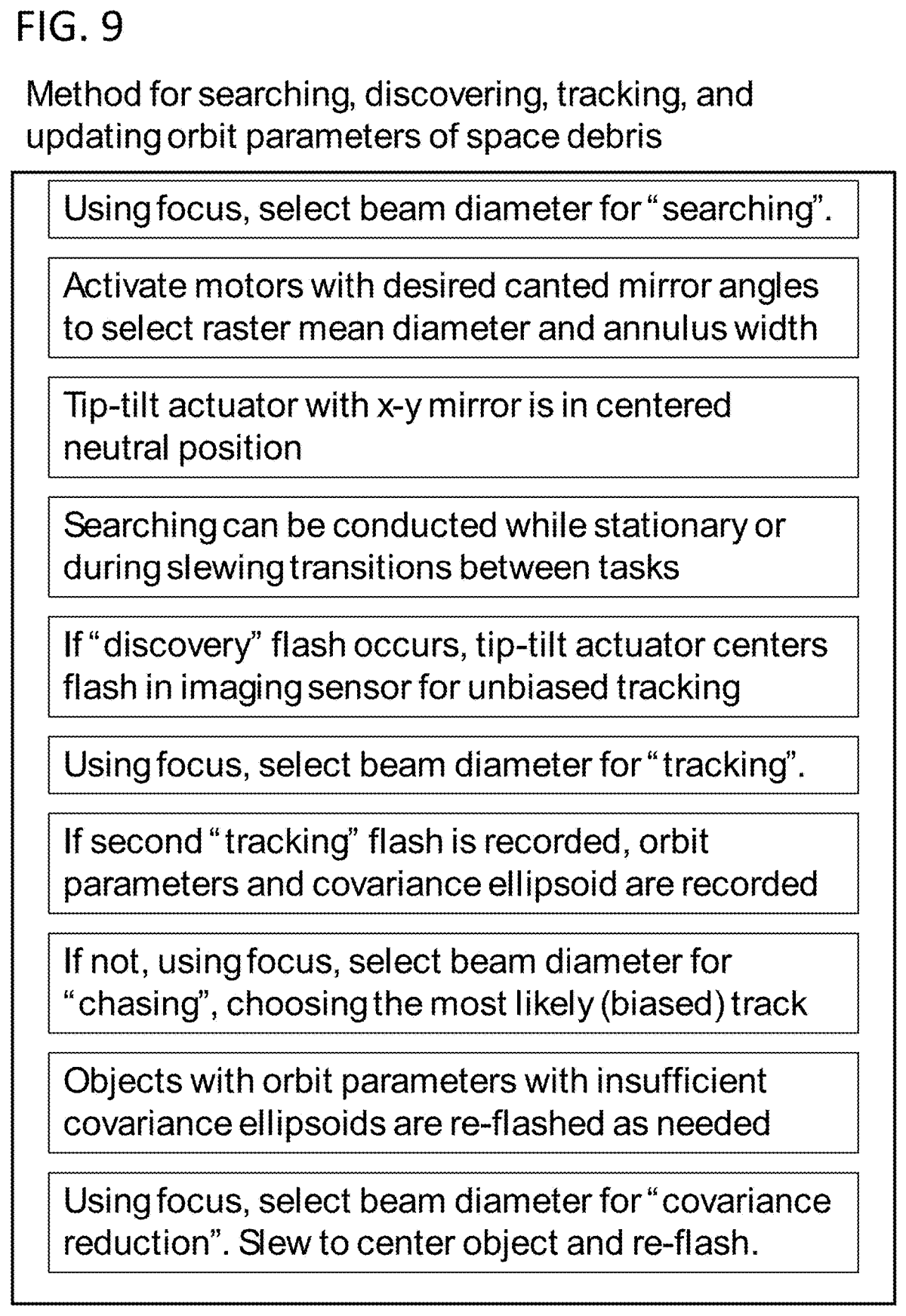

Method for searching, discovering, tracking, and updating orbit parameters of space debris Using focus, select beam diameter for "searching".

Activate motors with desired canted mirror angles to select raster mean diameter and annulus width Tip-tilt actuator with x-y mirror is in centered neutral position Searching can be conducted while stationary or during slewing transitions between tasks If "discovery" flash occurs, tip-tilt actuator centers flash in imaging sensor for unbiased tracking Using focus, select beam diameter for "tracking".

If second "tracking" flash is recorded, orbit parameters and covariance ellipsoid are recorded If not, using focus, select beam diameter for "chasing", choosing the most likely (biased) track Objects with orbit parameters with insufficient covariance ellipsoids are re-flashed as needed Using focus, select beam diameter for "covariance reduction". Slew to center object and re-flash.

SYSTEM AND TECHNIQUES FOR DISCOVERY AND TRACKING OF OBJECTS IN SPACE

CROSS-REFERENCE TO RELATED APPLICATIONS

This patent application claims the benefit of U.S. Provisional Patent Application No. 63/622,916, titled "System and Techniques for Discovery and Tracking of Objects in Space," filed on Jan. 19, 2024, which is herein incorporated by reference in its entirety.

FIELD OF THE DISCLOSURE

The present disclosure relates to using active laser illumination and, more particularly, to using active laser illumination for space situational awareness and space domain awareness.

BACKGROUND

Space situational awareness (SSA) includes, among other facets, the discovering and tracking of orbiting space objects. Orbital debris poses risks to operational satellites and manned space missions, risks that are increasing with time. A related field, space domain awareness (SDA), adds the goal of discerning any nefarious intent of orbiting objects that could jeopardize national security, especially by camouflage, concealment, deception, or maneuvering (CCDM) behavior. Managing these risks is a goal of space situational awareness and space domain awareness.

SUMMARY

The subject matter of this application may involve, in some cases, interrelated products, alternative solutions to a particular problem, and/or a plurality of different uses of a single system or article.

One example embodiment provides a system including: a laser configured to emit an output beam of locked wavelength and having a linewidth less than about 1 nm wide; an output beam scanner configured to distribute illumination of the output beam over a region of space; and an observation side of the system including a sensor configured to collect and digitize reflected light.

In some cases, the laser is a gas laser. In some instances, the gas laser is a diode-pumped alkali laser (DPAL) configured to utilize an alkali vapor including at least one of potassium, cesium, rubidium-85, and rubidium-87. In some instances, the DPAL includes an intra-cavity absorber including a vapor cell containing an alkali vapor including at least one of potassium, cesium, rubidium-85, and rubidium-87, wherein the intra-cavity absorber is configured to center the wavelength of the output beam between hyperfine-split ground-state levels. In some instances, the DPAL is configured for laser brightness enhancement by taking advantage of thermal storage by boosting a pump diode amperage in a quasi-continuous wave mode of operation.

In some cases, the laser is a pulsed laser. In some instances, the pulsed laser has a pulse frequency of 10 kHz or greater. In some instances, the pulsed laser is configured to pulse with an inter-pulse interval that is less than a light transit time, with sufficient laser axis slewing across a field-of-view during that inter-pulse interval such that a two-dimensional position of a flash observed by the sensor on the observing side of the system allows for disambiguation of transit time.

In some cases, the observing side of the system is configured for selective sensitivity to the wavelength of the output beam.

In some cases, the observing side of the system includes at least one Faraday anomalous dispersion optical filter.

In some cases, the laser includes an unstable resonator configured to produce a resonator beam which follows a distinct, multi-segmental path that passes more than twice through an amplifier. In some instances, the laser further includes a plane polarizer disposed in the unstable resonator. In some instances, the laser further includes at least one active component configured to modulate a polarization of the resonator beam. In some instances, the laser further includes at least one passive component configured to alter a polarization of the resonator beam for a portion of its path in the unstable resonator. In some example instances, the at least one passive component includes at least one quarter-waveplate. In some example instances, the portion of the resonator beam path is substantially circularly polarized and at least one vapor cell is disposed in the path and immersed in a transverse magnetic field such that vapor atoms become polarized and precess about a magnetic field direction, executing electron paramagnetic resonance.

In some cases, the observing side of the system includes a photon intensifier configured to quantify weak reflection signals.

In some cases, the sensor includes a plurality of pixels configured to distinguish between different orientations of a raster, thereby disambiguating an originating beam pulse for determining a unique transit time.

In some cases, the observing side of the system is configured with a time digitizing capability.

In some cases, the observing side of the system further includes a plane polarizer configured to enhance a signal-to-noise ratio.

In some cases, the system further includes at least one sensor configured to quantify light that does not meet a polarization or wavelength bandpass criterion, to allow for at least one of: detection of fast-approaching and/or fast-receding objects whose reflections may be Doppler-shifted; and detection of starlight for performing adaptive-optics corrections.

In some cases, the system further includes: a telescope for collecting light reflected from an object located within the region of space; and a transmitting telescope configured for directing the output beam into the region of space.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

BRIEF DESCRIPTION OF THE DRAWINGS

FIG. 1A illustrates system and/or technique options for illumination in accordance with various embodiments of the present disclosure.

FIG. 1B illustrates system and/or technique options for observing reflections from illuminated objects in accordance with various embodiments of the present disclosure.

FIG. 6 illustrates details of a recycling chicane, including elements for polarization refinement, conversion of polarization from plane to circular, and vapor cells serving as saturable absorbers and beam shutters controlled by electron paramagnetic resonance in accordance with an embodiment of the present disclosure.

FIG. 9 illustrates a method of utilizing a raster for searching, discovering, and tracking space debris in accordance with an embodiment of the present disclosure.

Figure 2:
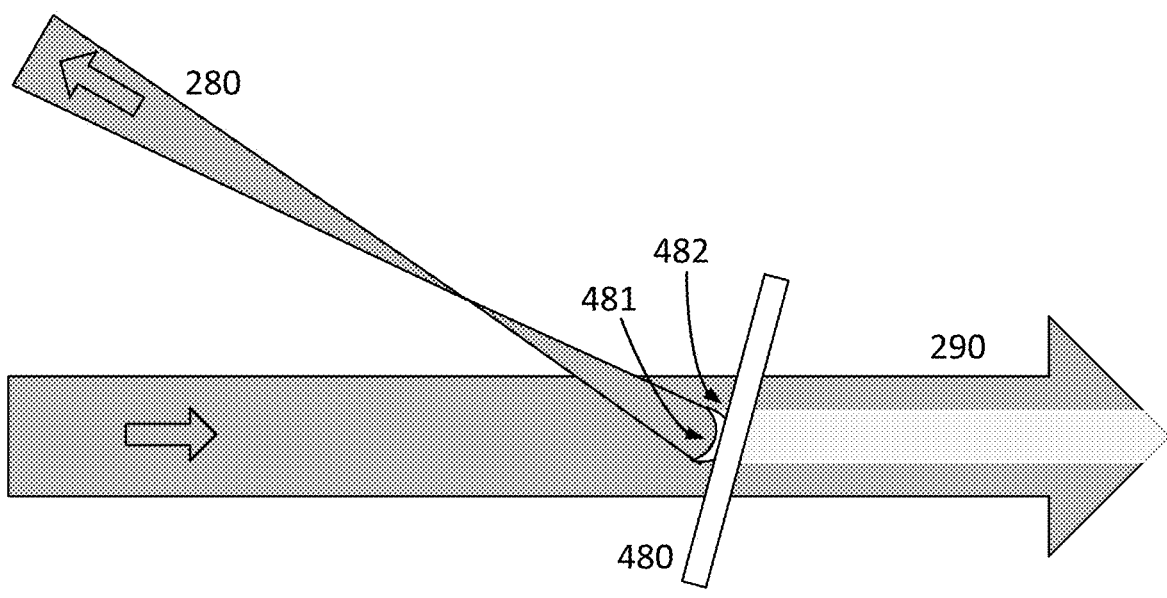
FIG. 2 illustrates an output coupler of the laser in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

General Overview

Inactive orbiting objects are growing in number. In addition to spent rocket bodies and end-of-life satellites, there are a number of fragments from intentional destructive testing and accidental collisions. Since 1959 there have been 80 anti-satellite tests carried out by four countries, including four direct-ascent tests in the past 15 years. At least six high-relative velocity collisions have occurred between a satellite and the debris field or between two satellites. In 1978, Donald Kessler wrote that the debris environment already was unstable, predicting exponential growth in number, to the point where orbits could become unusable.

Orbital debris poses a collision risk to commercial and government satellites and to endeavors such as the International Space Station (ISS) together with the individuals conducting research there. Current strategies for collision avoidance require active thrusting of satellites based on knowledge of orbital parameters. Tens of thousands of large objects of size greater than 10 cm are currently tracked by radar. However, a much larger number of smaller objects orbit with unknown orbital parameters. While satellites are generally designed with some physical protection from collisions with objects smaller than 1 mm, there is a range of object size-between 1 mm and 10 cm—that is currently unknown and whose orbital trajectories pose risks to satellites. The number of such objects is estimated to be of order ten million to one hundred million. As such, a system for discovering orbiting objects in space that are smaller than 10 cm and larger than 1 mm and tracking them in their orbits is needed.

Space situational awareness (SSA) is a concern for national security, scientific missions, and for civilian commerce. The United States operates the largest network of space observation sensors and maintains the most complete catalog of space objects. The U.S. system is known as the Space Surveillance Network (SSN) and is managed by the military. It consists primarily of phased array radars, a few mechanical tracking radars, and a large space radar fence located along the southern United States. The Joint Space Operations Center (JSpOC), located at Vandenberg Air Force Base in California, maintains a database of the orbital trajectories of more than 23,000 space objects, which is used to perform a variety of analyses to support commercial and civil spaceflight safety along with military and intelligence applications. These services include providing conjunction assessment (CA) warnings to all satellite operators as part of the SSA Sharing Program. The U.S. has negotiated a significant number of bilateral data sharing agreements with more than 50 individual satellite operators, eleven countries, and two international intergovernmental organizations.

The NASA Orbital Debris Program Office (ODPO) has conducted a longstanding observational optical program using fixed telescopes and solar illumination. In 2015, the 1.3-meter Eugene Stansbery-Meter Class Autonomous Telescope (ES-MCAT) achieved first-light, reaching full capability in 2021. Installed on Ascension Island, ES-MCAT supports autonomous observations of orbital debris smaller than one meter, including historically under-sampled high-altitude orbital regimes. ES-MCAT recently completed its survey of GEO within its region of interest. Predecessors to ES-MCAT include: a charge-coupled device (CCD)-equipped 0.3-meter Schmidt camera, known as the CCD Debris Telescope (CDT); a 3-m-diameter liquid mirror telescope, known as the Liquid Mirror Telescope (LMT); and the 0.6-m Michigan Orbital Debris Survey Telescope (MODEST).

International efforts are also coming online. In 2022, the 4-meter International Liquid Mirror Telescope (ILMT) was installed at Devasthal Observatory in India. Pointed fixed at zenith, it scans the sky as the Earth rotates, identifying orbiting objects as streaks from reflected sunlight. Also in 2022, the German Aerospace Center commissioned the Johannes Kepler Observatory (JKO) at a site near the Institute of Technical Physics in the Black Forest to investigate both passive observations and active laser ranging. A transportable laser ranging station known as the Surveillance, Tracking, and Ranging-Container (STAR-C) is currently operating, while an eye-safe, near infrared laser system is being deployed to enable laser ranging in a crowded airspace.

Radar technology is also being upgraded. Currently, the world's highest-resolution radar for imaging of space objects in support of SSA is the MIT/LL Haystack Ultra-wideband Satellite Imaging Radar (HUSIR). HUSIR's ability to generate X-band and W-band images simultaneously enables it to provide groundbreaking data about the size, shape, orientation, and motion of objects orbiting Earth. In addition, HUSIR can characterize individual components of large, complex objects and can distinguish small objects from each other. HUSIR provides data on orbital debris down to approximately 5 mm in size at altitudes below 1,000 km. Additionally, the Goldstone orbital debris radar conducts radar observations two to four times per month. Because both rely on the sweep of the Earth's rotation and the transit of the object's orbital trajectory for sampling single objects, neither program is well-suited for searching the full sky to discover and track most/all unknown objects.

The currently available approaches do not have simultaneous capability for being efficient, sensitive, and precise for investigating low Earth orbit (LEO) for the purpose of discovering most or all relevant debris. While the SSN seeks to maintain a catalog of orbital threats, it is reputedly limited to objects larger than 10 cm. Optical strategies (and the HUSIR and Goldstone radars) are limited to focusing on a small number of objects (e.g., to measure their distance or rotation or to characterize a representative subset of the orbital debris population).

Thus, and in accordance with some embodiments of the present disclosure, a system for an efficient, sensitive, and precise system for investigating LEO for the purpose of discovering most orbiting space debris above a threshold size is disclosed. In preferred embodiments, a system for interrogating a region of space is disclosed, where "interrogating" is defined as actively illuminating a three-dimensional columnar region of space with sufficient laser light such that a companion receiving telescope would positively confirm a detection event via the reflected light if any object of sufficient size and albedo were present at a corresponding altitude. Over time, an extensive region of space can become covered with such searching interrogations by rastering the illuminating laser beam through a transmit telescope. Ideally, each search interrogation should constitute illuminating a distinct, non-overlapping region of space, thereby maximizing the rate of coverage. A detection event corresponds to a reflected-light signal-above-threshold in one or more multi-pixel arrays at the focal plane of a receiving telescope pointed to overlap the interrogated region of space. The rate of performing independent interrogations constitutes an important metric of the efficiency of the system.

As disclosed herein, the high power and narrow linewidth of an alkali vapor laser augmented with internal fast beam steering allows for broad sky coverage. Pairing this transmit capability with the ultra-narrow bandpass of an alkali vapor atomic line filter for the observing telescope improves discrimination of any reflected light, even during daytime.

As disclosed herein, high spatial concentration of the laser beam and temporal concentration by pulsing of the beam each contribute to raising the intensity of the illumination in space and time. Pairing this concentrated intensity with a viewer, such as an avalanche photodiode array or a multipixel sensor augmented with a fast-risetime image intensifier that can sense nearly instantaneous intensity, maximizes dynamic range in intensity between the illumination and detection.

As disclosed herein, the temporal resolution of the pulsed beam and the receiver can be combined to determine the altitude of the space object by time-of-flight. Since the round-trip time of a pulse from the Earth's surface to an object at 1,000-km altitude and back is 6.7 ms, there can be a discrete ambiguity in determining the altitude if several pulses are emitted within that timeframe. As disclosed herein, a system of moving optical elements can launch the beam along a unique path for each pulse, so that the location of the pixel on the sensor that detects the reflection determines not only the 2-D position of the orbiting object at that time, but also disambiguates the origin time of the laser pulse, establishing the altitude of the orbiting object by a unique time-of-flight.

As disclosed herein, polarization of the laser light and polarization separation in the detector further can distinguish signal from background and further can encode temporal information.

As disclosed herein, a high-power laser beam with unique spectral, spatial, and temporal properties combined with an observational system that can discriminate the spectral, spatial, and temporal reflections of light from that laser beam can assist in assessing the debris population. Faraday anomalous dispersion optical filter (FADOF) technology using alkali vapor has long provided picometer-quality performance as a bandpass filter for optical wavelengths near atomic transition lines. Recently, alkali vapors were also demonstrated for generating high-power laser beams. Integrating a diode-pumped alkali laser (DPAL) into a transmitting telescope and incorporating a FADOF into an observing telescope can provide matched capabilities to search for modest sized debris over all LEOs on an attractive timescale. Spatial and temporal definition of the light, including with pulses and positioning and with appropriate measurement precision, can permit tracking the orbits of newly discovered objects, thereby maintaining custody of their orbital parameters.

Any detection event that occurs during searching in a region of space where no object was anticipated constitutes a discovery event. All discovery events must be followed by one or more tracking interrogation sequences. Laser scanning may be altered with tracking interrogations interspersed with search interrogations to perform repeat detection events spaced in time such that each determine the discovered object's location, to determine its velocity and, ultimately, its orbit.

For assessing a strategy on orbital debris discovery, we first examine the threshold for detection. There is a relationship between the height of an object in LEO and the fraction of photons reflected from it that will enter the aperture of an observing telescope on Earth. Consider, for example, an object's cross-sectional area, its albedo for reflection, and its height above the detector. Assuming some value for the albedo (say 0.18), the photons reflected increase as the object's radius squared, and decrease as its height squared. Consequently, any system will have its threshold for detection of large objects at higher altitudes and smaller objects at lower altitudes in the ratio of fixed r/h. We will use 500 km as a reference height.

Secondly, we examine the relationship between the patch size of a distinct interrogation, the number of such patches that cover the sphere containing all LEOs, and the rate of discovery. Assuming random discovery at a constant rate, the rate of undiscovered objects decreases exponentially as the ratio of interrogated patch area to total area. At 500 km, the surface area of the sphere is $6 \times 10^{14}$ m$^2$. Using 5 m$^2$ as a reference area for interrogations, we require $1.2 \times 10^{14}$ interrogations, of 5 m$^2$ each, to randomly discover 63% of the objects.

Third, we reference the relationship between the fractional return of light due to reflections to the energy in a single photon. These considerations determine the brightness desired for each interrogation goal, the desired rate for completing such interrogations, and finally the laser power required to interrogate the full sphere of LEOs in search of objects of a specific size.

Finally, we relate the interrogation rate to calendar time. A pulse rate of 500 kHz will interrogate $2.5 \times 10^6$ m²/s (i.e., 2.5 km²/s), covering $8 \times 10^{13}$ m²/yr. Therefore, a single LiDAR station will require 7.7 yrs to interrogate a region equivalent to the full sphere, discovering 63% (inverse the exponential constant) of objects in that time. Note that a network of ten systems can operate in parallel. This distributed configuration may offer additional benefits such as resilience against local weather disruptions, or lower vulnerability to adversarial interference.

FIG. 1A illustrates system and/or technique options for illumination in accordance with various embodiments of the present disclosure.

FIG. 1B illustrates system and/or technique options for observing reflections from illuminated objects in accordance with various embodiments of the present disclosure.

Structure, Operation, and Methodologies

Laser Power: For purposes of further quantitation, we begin by assuming a threshold of 15 photons in a 1-m telescope (area 0.78 m²) (i.e., a reflected intensity of twenty photons per square meter back at Earth within the interrogation measurement interval). This reflected illumination at ground level requires 20 times $2\pi$ (500,000 meters)$2 = 3.2 \times 10^{13}$ photons uniformly emitted into $2\pi$ from a source 500 km away. If the orbiting object's diameter is 9.2 cm (areal cross-section of 66 cm²) with albedo of 0.18, the illumination intensity then is $3 \times 10^{16}$ photons/m² within the measurement interval. If the laser illuminates an area of 5 m² (2.5-meter diameter), then the laser may send $2 \times 10^{17}$ photons upward within the measurement interval. If the measurement interval averages 2 las, then the laser power averages $10^{23}$ photons/s. At a wavelength of 795 nm, the photon energy is $2.5 \times 10^{-19}$ J, and the required laser power is 25 kW.

Raster Scanning: For each pixel's measurement to be considered independent, its area should have minimal overlap with another pixel's volume. A discovery interrogation strategy should scan a region of space such that the probability of observing an orbiting object within a chosen scan volume should be near unity. For disambiguation, the raster should fully overlap or revisit a scan pixel only when the orbiting object has moved away from the entire scan region. For discussion purposes, we choose an interrogation rate of 500 kHz. Objects in orbit move at 7.8 km/s. The area of the raster scan, which is the time spent for one full raster scan times the pixel size over the pixel duration, equal to the length of the raster side squared, also should be greater or equal to the orbital velocity times the raster scan time. Solving this, the total raster time should be greater than the pixel size divided by the pixel duration and divided by orbital velocity squared. For 2.5-m diameter pixels (5 m² interrogated each 2 $\rho$s), the raster time is 20 ms, during which time the interrogations should not overlap. Within that time, there will be 10,000 interrogations, which should be distinguishable with minimal overlap. For disambiguation, the imaging sensor of the viewing system also should provide more than this number of pixels.

Rotating Raster Mirrors: Oscillatory motion of tilting and tipping one or more mirrors along two orthogonal dimensions offers a conceptually simple strategy for rastering the beam but may not be practical at the high speeds required here. Rotational motion offers an alternative method of achieving fast motion of the illuminating laser's beam. Consider one or more mirrors, either planar or spherical, at the end of a rotating shaft with a normal that is not the axis of rotation. A beam point reflected from such a rotating mirror will trace a circular path. As an example, a beam with 2.5-m diameter may trace a pattern at 500 km altitude that is circular with an average radius of 150 m, a circumference of 942 m, with 377 interrogations. At 2 $\mu$s per interrogation, the rotation period of the raster is 754 $\rho$s. Consequently, the rotation frequency of the raster is 1,330 rotations/s or 80,000 rpm. Faster rotation will provide additional separation between pulse spots.

Oscillation of one or more separate elements at a slower speed to map out a two-dimensional area can be either rotational or translational oscillation. With 377 spots around the mean diameter of the raster, there are at least 26 (that is, 10,000/377) distinguishable circles separated by the spot diameter. If this separation is produced by a second rotating canted mirror, that second mirror produces an annulus with a minimum width of 66 m (that is, $26 \times 2.5$ m).

We can calculate the time required to discover and track most objects of a given size and altitude. With our reference altitude of 500 km added to the Earth's radius of 6,378 km, we have a mappable surface area of $6 \times 10^{14}$ m². Assuming a 5-m² interrogation on average every 2 $\rho$s, the mapping characteristic time is 6.7 yrs. Since detection events are random, the number of undiscovered objects decays exponentially with this time constant. If the number of objects of dimension 10 cm² is 100,000, then detections will occur at an average rate of one every 40 min. Note that smaller objects whose orbits are lower than 500 km and larger objects farther away will be discovered and join the list of tracked objects as well. The accuracy of the position measurement in the two transverse directions will be determined by the lesser of the laser spot size for the interrogation and the point-spread function in the observing telescope, which primarily may be determined by the pixel size but also includes image intensifier bloom and telescope aberrations.

Tracking: Upon observing a flash above threshold, the discovery strategy is immediately suspended, and a tracking strategy is initiated to reacquire the discovered object. An unbiased search would focus on a zone of likely object positions surrounding the flash and spaced from the flash a radial distance that expands at 7.8 km/s. A minimum of two observations with full three-dimensional information should be acquired to take custody of the object's orbit. The object's height can be determined by associating the flash's two-dimensional location with a unique point in the raster scan, so that the time that the beam originated can be compared with the time the photons were observed, yielding the transit time.

Mode-Locking: For many lasers, a saturable absorber can be matched to the lasing gain amplifier. A saturable absorber absorbs laser light for weak beam intensity and becomes transmissive for stronger beam intensity. Inserting the saturable absorber into the lasing cavity will introduce a coupling between longitudinal modes (a spread in wavelengths), causing the beam energy to bunch-up in time into high-intensity pulses. Because the output coupler reinjects a portion of the beam for subsequent amplification, the temporal structure of the beam will repeat with the period of the laser cavity's round-trip time. The system will evolve until a minimum pulse length is reached, which is determined by the bandwidth of the lasing amplifier. A gas laser with an amplification bandwidth in wavelength of ±1 pm will support a pulse width of approximately 0.5 ns. The round-trip path in the laser cavity determines the pulse spacing. In some cases, especially for long round-trip path lengths, there can be more than one pulse per round-trip transit time, each contributing a low-power replica at the output coupler for the next round of amplification. The time interval between pulses extracting energy from the amplifier should be chosen to be shorter than either the time for populating the lasing state or the natural lifetime for decay of the lasing state. For pulse interval times shorter than these time constants, the loss in average output power can be minimal.

Q-Switching by Electron Paramagnetic Resonance: Q-switching is an approach to achieving pulsed laser output with an advantage that it can be synchronized to external stimuli. For alkali atoms, electron paramagnetic resonance (EPR) is a phenomenon that achieves gyromagnetic motion of alkali atoms immersed in a uniform magnetic field in resonance with an external radiofrequency (RF) field. If the atoms become polarized, then they can absorb circularly polarized beam photons only when the electrons are anti-aligned and can become transparent when the electronic polarization of the alkali atoms is aligned with the beam's circular polarization. The magnetic field should be chosen so that (a) the resonant EPR frequency is equal to (b) the frequency with which the pulse cycles around the beam path length or an integer multiple of that frequency. Consider an alkali vapor cell with nitrogen buffer gas immersed in such a magnetic field that is oriented transverse to the laser beam and an RF coil aligned with the beam and tuned to the resonant EPR frequency. The cell will be transparent for resonant circularly polarized beam photons only during a narrow phase angle of the EPR driving frequency and absorptive at other times. If the EPR frequency is chosen as a multiple of the path-length cycling frequency, then there will be an additional narrow phase interval when the EPR atoms are transparent to beam photons. This brief interval of transparency favors development of an additional pulse. Thus, an EPR tuned to a multiple of the beam pulse path-length cycling frequency can support populating a ring laser circuit with more than one pulse with equal and uniform time spacing.

In some embodiments, the altitude of the resident space object (RSO) is determined from beam pulse transit-time measurement. If the two-dimensional reflection-observing imager successfully determines the identity of the source raster-pulse unambiguously, then the transit time can be determined with uncertainty in the nanosecond range, contributing only one-third of a meter to the height determination. In some instances, there may be more than one pulse whose spatial overlap causes uncertainty, in which pulse originated the observed pulse, giving rise to more than one possibility for the altitude—a discrete ambiguity. In these instances, the observation of a second flash, required for tracking, also will resolve this discrete ambiguity in the altitude determination.

Parallax: In some embodiments, the laser's beam director telescope and the observing sensor's telescope are separated apart by a parallax distance. The laser transmission axis and the reflection observing axis will be oriented such that the two cross each other at some altitude. With some choice of orientation, the Mie scattering of the laser by the atmosphere can be excluded from the view of the observing telescope. The x-y position of the raster will produce a flash at the same x-y position in the imaging sensor only for that single altitude where the axes cross. For lower and higher altitudes, a parallax correction is required in the disambiguation algorithm.

Temporally compressing the laser energy into a nanosecond pulse, by mode-locking, Q-switching, or some combination thereof, provides an advantage for differentiating signal above background if the sensor on the receiving side has a similarly short response time. Given that a signal for a detection event consists of several photons, shortening the duration over which those photons arrive improves the signal-to-noise ratio (SNR).

Transmission Wavelength Selection and Observation Wavelength Filtering: Discovery of objects using reflections requires signal strength at ground level to produce a sufficient number of photons above a threshold in the observing telescope. If there is also background from other sources, discrimination can become problematic. High-power lasers that rely on solid-state amplifiers typically would have a wavelength power spectrum that spans several nanometers in width. The observing telescope can be outfitted with a bandpass filter that permits observation only within that span of wavelengths.

On the other hand, gas lasers can have linewidths that span only a few picometers. Discriminating the light from gas lasers against background sources using diffraction methods with bandpass width of several nanometers does not extract the full benefit of this extremely narrow emission spectrum. Atomic line filter (ALF) technology, especially Faraday anomalous dispersion optical filters (FADOFs), can provide bandpass regions of a few picometers with nearly 100% transmission while fully attenuating optical power outside this range. We evaluate the discriminating power of this technology by estimating the optical power within this range during daylight. Irradiance of 1 mW/cm$^2$str·μm will enter a viewing telescope aperture of 3-m diameter (7 m$^2$ area) and overlap a viewing acceptance of the full raster scan of 21 μstr. The power within 2 μm of linewidth over the entire focal plane is 3 nW or 1.2×10$^{10}$ photons/s. In a megapixel detector, the rate will be 1.2× 10$^4$ per second per pixel. The rate of two photons occurring within a 200-ns time window (if the overlap interval is determined by raster slewing) is 27/s. The rate of two photons occurring within a 2-ns time window (if the overlap interval is determined by mode-locking pulse length discrimination) is 1/3.7 s. We conclude that the combination of an alkali vapor laser with an ALF will allow daytime searching with an acceptable background rate in an nanosecond-capable detector using a threshold of three photons. Using a conventional filter with wavelength bandpass of 2 nm together with a solid-state laser rather than the 2-pm bandpass offered by an ALF and alkali vapor laser admits single-photon background rates higher by a factor of one thousand and two-photon trigger rates that are higher by a factor of one million.

Light reflected from moving objects undergoes a Doppler shift in wavelength. Limiting the observation bandwidth to a few picometers requires that we examine the motion of objects in our search field and apparatus. A wavelength shift of 2 pm, placing the signal outside the bandpass region, will occur for a reflection from an object with 370 m/s relative motion. Mirror slewing at 20 rad/s induces a maximum velocity at the mirror edge of 20 m/s per meter of mirror radius, or 0.2 m/s for a centimeter-size mirror. This motion will not affect viewing. Velocity components along the line-of-sight can reach 7 km/s for highly elliptical orbits, inducing a Doppler shift of 37 pm. These will not pass through the ALF and instead will be reflected together with other light outside the ultra-narrow bandpass. That light, however, still can be imaged (and polarization analyzed, as explained below). While the ultra-narrow FADOF bandpass is useful for observing during daytime, only trajectories with closing velocities less than 370 m/s can be discriminated. Night-time observing can make use of all photons and view all trajectories.

Quasi-Continuous Wave Operation: The power output of continuous-wave (CW) lasers is limited by their ability to remove heat. Many manufacturers provide power and thermal ranges for assuring lifetimes of 10,000 hours within an acceptable 10% loss of performance. Operation at power levels that drive temperatures above these thermal limitations are known to decrease lifetimes. However, it is widely known that a train of short pulses of power, on the order of tens to hundreds of microseconds, with a subsequent cool-off period are sustainable. If the duty factor is reduced from unity at constant average power, careful consideration should be paid to thermal limits during higher-than-nominal current pulses. The overall average power output may be nearly maintained if pulses are sufficiently short. Quasi-CW operation, illuminating at higher power for duty factor below unity, can improve SNR, at the expense of discovery rate.

In some embodiments, the laser beam may be encoded with a pattern of alternating polarizations, either linear or circular. In the observing telescope, a lossless polarization separator can direct photons of different polarizations along orthogonal directions, each to its own imaging sensors in the receiving telescope. Delivering pulses with unique polarization also has benefits for searching. Signals from the source are further differentiated from background by having all photons appear only in a single polarization's imaging sensor(s). Unpolarized photon noise from the field would be reduced by an additional factor of two, improving SNR. Furthermore, the rate of two-photon triggers within a discrimination period would be reduced by a factor of four.

In some embodiments, the pattern of alternating polarizations can be encoded with a bit pattern. A series of repeated ranging measurements is required for tracking, acquiring, and maintaining custody over a found object's orbital parameters. For these sequences, rastering is not useful for associating the detection time with the origination time because the raster remains pointed at the object. Embedding information with a long repeat time, such as an alphabet from a comma-free, self-synchronizing code, into the bit sequence and extracting that information in the imager serves as a sufficient alternative.

Discovery and Tracking Strategy

Optimization of Orbital Object Discovery Strategy: Satellites have been launched into a great variety of orbits. A large number that are in near-circular, low-Earth, prograde orbits will pass overhead most low-latitude observing locations. A simple strategy of continuously raster-scanning a patch near the zenith would allow detection of these objects and most debris generated by similarly orbiting objects. We the transmitting and observing telescopes can improve discovery. Also, coordinated motion of the transmitting and observing telescope will improve the performance of the tracking strategy vastly (as discussed below). Therefore, we disclose discovery strategies that include telescope pointing motion.

Several satellite orbits are utilized that do not traverse all longitudes and, therefore, would require special strategies for discovering and tracking orbital debris. One special case is geosynchronous orbit (GEO), a prograde, low-inclination orbit with a period of 23 hours, 56 minutes, 4 seconds at 35,786 km above Earth's surface (42,164 km from Earth's center), where each orbital station around the Earth should be independently examined. Illumination of objects in geo-synchronous orbit can be performed with a transmit tele-scope with spot-size and intensity similar to that of illuminating LEO, perhaps by employing a larger transmit telescope mirror. However, the returning illumination will be weaker if emitted into $2\pi$ steradians from that height. Since the height is eighty-nine times greater, the returning illumination is reduced by a factor of 8,000. Furthermore, several tracking stations on Earth would be required, each to investigate a swath of the geosynchronous belt. Other orbits that are synchronized with regions on the Earth's surface, such as the Tundra orbit, Quasi-zenith orbit, or Molniya orbit also would require customized strategies, specifically adapted for the task, such as for pinpointing drifting known objects, for discovering debris that threatens valuable friendly assets, or for monitoring avoidance attempts by unfriendly assets.

Optimization of Tracking Strategy: To completely describe an orbit mathematically, six quantities should be determined. These quantities, known as Keplerian elements, are: (1) semi-major axis; (2) eccentricity; (3) inclination (the angular distance of the orbital plane from the plane of the planet's equator); (4) argument of periapsis (angular distance of the periapsis from the ascending node); (5) time of periapsis passage; and (6) celestial longitude of the ascending node. These parameters can be determined from two measurements of the three-dimensional position of an object (and their times).

Tracking commences immediately when a discovery event is observed. Tracking strategy may differ from the searching strategy. 1) The laser focal spot-size may be altered. 2) The boost factor may be increased to increase illumination intensity. 3) The center of the raster scan may be shifted to maximize overlap with the expected position of the found object. 4) The telescope pair may be repositioned to the expected position of the found object. We disclose three stages of tracking here in Table 1:

TABLE 1

Reconfirmation: Without moving the telescopes, the raster scan concentrates on the two-dimensional region of discovery and searches with a more concentrated raster pattern, larger spot, or temporarily reduced duty factor to confirm the discovery and to acquire another three-dimensional position, to calculate an approximate trajectory.

Subsequent Point(s): The telescope pair then will schedule one or more coordinated slews to a location along the trajectory to refine the trajectory calculation.

Maintaining Custody: Objects are committed to a custody catalog. Future observations are scheduled when the object's uncertainty "ellipsoid" grows to approach an unacceptable level.

have described that discovery is time-consuming, requiring on the order of several years for finding half of sought LEO objects.

That simple observing strategy, stationary at zenith, may fall short of SSA goals, particularly where Earth or Sun synchronous orbits are concerned. Coordinated motion of Observing time is scheduled for re-acquiring and maintaining custody of the orbits of $10^5$-$10^6$ objects, allocating, perhaps, one second per measurement, which saturates to roughly 10-20% of observing time devoted to tracking, with the majority of the time devoted to discovery, even after most objects have been discovered. This time commitment, one month per year devoted to re-acquiring and maintaining custody of orbits, should not appreciably limit overall efficiency.

We target comprehensive acquisition of debris of a certain size at a mean height of 500 km but seek to acquire smaller and larger objects within a height range between 150 km and 1,500 km. The transit time from earth to an orbiting object at 150 km elevation and reflecting back is 1 ms. Transit time to 1,500 km is 10 ms. To allow searches of LEOs to unambiguously determine the transit time for a particular measurement, the raster should provide independent interrogation locations every pulse without revisiting its path at least for this 10 ms disambiguation duration. Our baseline rastering program exceeds this disambiguation period. The two-dimensional location of a detection event's flash can be traced to the position of the raster during emission, which in turn determines the pulse transit time.

In one mode of operation, the system initially spends most of its time in search-mode, staring in a fixed, arbitrary location, such as at zenith or at a particularly dark region of sky, only slewing to another region of sky to reacquire a found object. Over time, however, most of the time will be spent searching while slewing to the next reacquisition of a found object. All interrogations, even while slewing, can yield independent contributions to the catalog of found objects. Initiating tracking on a newly found object and adding it to the catalog has priority over reacquiring and updating a catalog object.

In another mode of operation, the system may spend a significant fraction of time near an isolated bright star, such that the guide star may be utilized for adaptive optics, to correct the wavefront for atmospheric turbulence. In some modes of operation, this guide star located in the field of view may be used to correct the wavefront using adaptive optics for the imaging telescope as well as for the transmitting telescope.

System Structure

A diode-pumped alkali laser (DPAL) operates by delivering pumping light centered on the D2 transition to the second excited state of an alkali vapor, such as potassium, rubidium-85, rubidium-87, or cesium. Collisions of the excited atoms with gas molecules can mix the spin-orbit P-states, thereby increasing the population of the lasing state. Stimulated emission occurs when this atom is exposed to lasing-transition photons in a resonator.

Power: Some embodiments of the disclosed system may utilize a DPAL with wavelength-stabilized pump lasers utilizing an external cavity. Some preferred embodiments utilize a FADOF in the external cavity to select wavelengths within a narrow range near the atomic line for feedback and amplification. Some preferred embodiments utilize the non-linear Kerr effect to select some wavelengths for deflection so they can be reflected in the external cavity selecting wavelengths within a narrow range near the atomic line for feedback and amplification. In some embodiments, the pump laser arrays can produce 20-2,000 kW of pump power. In some preferred embodiments, the pump laser arrays produce 50-500 kW of pump power. In some embodiments, the DPAL amplifier is illuminated transversely to the output beam direction. In some embodiments, the illumination directions are radial, also transverse to the output beam direction. In some embodiments, the pump illumination is delivered at intensities between 100-2,000 W/cm$^2$. In preferred embodiments, the pump intensity is 200-1,000 W/cm$^2$.

Wavelength: Optimization of the performance of the DPAL for a particular task determines many features and characteristics, such as the choice of alkali, the gas identity or mix, the gas pressure, and the alkali vapor concentration. We seek a new optimization of these parameters, specifically for producing a beam at the precise wavelength that can be viewed with a FADOF ALF. In prior art, gas was maintained at pressure between 3-10 bar, with two separate goals: 1) broadening the absorption band of pump light; and 2) mixing the P-state spin orbit pair. For this application however, high pressure has disadvantages. First, high pressure broadens the lasing transition linewidth such that most of the power lies outside the viewing bandpass of a FADOF. Also, high pressure lowers the peak interaction cross-section, requiring higher alkali concentrations, which can raise intrinsic inefficiencies. Very low pressure also has disadvantages. Loss of efficiency is associated with pressure that is too low, especially of the methane/ethane mixing agent, with a minimum pressure of 150 torr.

In some embodiments, the gas pressure is optimized by considering the pressure-broadening and the gain-induced laser narrowing. The spectral broadening of the absorption band is 18 GHz per bar for helium and 27 GHz per bar for ethane and methane. Furthermore, laser gain narrowing of the output linewidth is estimated to be roughly a factor of eight to ten. Therefore, to achieve a laser linewidth of under 2 GHz, the pressure-broadened linewidth of the lasing gas should be no more than 20 GHz, roughly 0.75-1 atm of gas, depending on species and mixture.

Furthermore, the gas mixture should be chosen to center the laser output in the bandpass of the FADOF. There is a red-shift of the centroid with pressure of –8 GHz/bar for methane/ethane and a blue-shift of +3.5 GHz/bar for helium. In some embodiments of the disclosed method, conditions are chosen such that the D1 lasing transition line is unshifted in wavelength from its vacuum value by opting for a gas mixture ratio that is chosen 70% helium and 30% ethane or methane. With methane/ethane pressure at 150 torr and helium at 350 torr, the overall pressure is 500 torr, roughly two-thirds of atmosphere. The absorption linewidth is 13 GHz, and the output linewidth is 1.3 GHz, roughly 2.6 pm, comparable with the FADOF bandpass.

In some embodiments of the disclosed method, a filter cell of alkali vapor, such as potassium, rubidium-85, rubidium-87, or cesium, is inserted into the resonant cavity, and controlled at a temperature that maximizes gain in the desired wavelength region centrally located between the hyperfine split ground state and reduces gain further from this central region. Such a filter cell will narrow the output laser linewidth and lock its wavelength to the desired value.

In some preferred embodiments of the disclosed method that include the filter cell of alkali vapor, the gas mixture may be chosen that is richer in ethane/methane to provide faster mixing of the spin-orbit pair and associated improvement in lasing efficiency, but without sufficient helium to compensate for the collisional red-shift in wavelength. In such an embodiment, higher interaction cross sections are possible due to lower overall pressure, lower alkali density is permitted thereby reducing inefficiencies, and higher spin-orbit mixing rates are achievable, allowing faster lasing cycle times. The gain in efficiency from lowering pressure and/or increasing ethane/methane concentration exceeds any loss in efficiency from inserting and absorber to shift the wavelength. For example, a gas choice of ¼ atmosphere of ethane/methane and zero helium would have a natural shift in the lasing transition of –2 GHz, but which may be shifted back to zero and locked by the absorptive filter.

In some embodiments of the disclosed method that exploit rubidium as the lasing agent, a preferred embodiment may select Rb-87 over natural rubidium or Rb-85, since the centroid between the hyperfine split ground state is blue-shifted from that of Rb-85 and the gap is wider.

Beam Path, Beam Pulse Tailoring: In some embodiments, the DPAL resonator is an unstable resonator with a magnification that causes (a) some fraction of the resonator beam in its perimeter region to escape the resonator and become the output beam and (b) some portion of the resonator beam inside that perimeter to be reflected, magnified, and fed back through the amplifier. In some embodiments, the unstable resonator is laid out in a linear geometry, and the beam passes back and forth along the optical axis. In some embodiments, the resonator elements constitute the turning points of a closed loop or ring.

In general, a ring laser can have a beam circulating in two directions, say clockwise and counterclockwise. A ring laser with an output coupler will allow a parallel beam in the resonator to approach the output coupler from both of these directions, each forming an output beam, and producing a focusing beam from the central portion for feedback and amplification. In some embodiments, a saturable absorber, such as a cell with alkali vapor and pressure of nitrogen, is disposed along a segment of the beam path. In some embodiments the saturable absorber is disposed at an optical focus, such as the focus for the clockwise beam following the output coupler. At that location, the clockwise beam is focused and has a high intensity, while the counterclockwise beam is parallel, distributed, and low intensity. The counterclockwise beam will therefore be quenched by the saturable absorber, and only the clockwise beam will survive.

Figure 3:
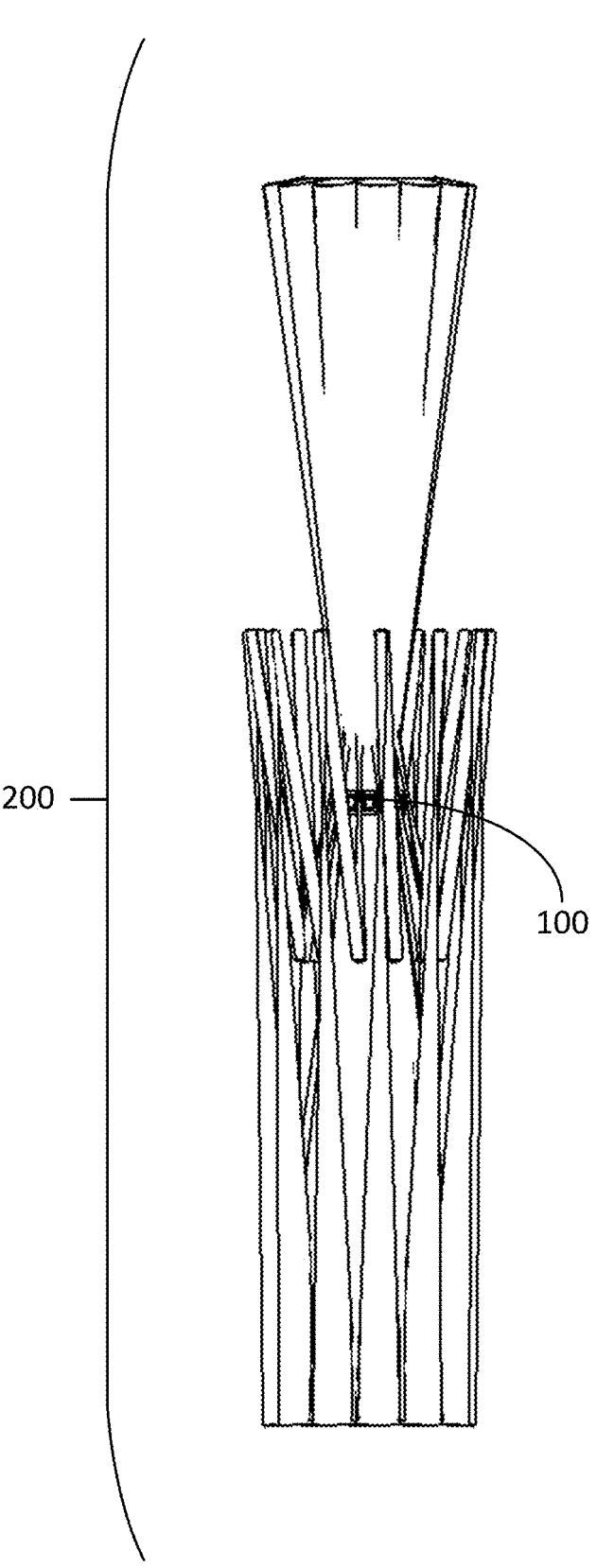
FIG. 3 illustrates a toroidal configuration that provides for multiple passes through the amplifier in accordance with an embodiment of the present disclosure.
Figure 4:
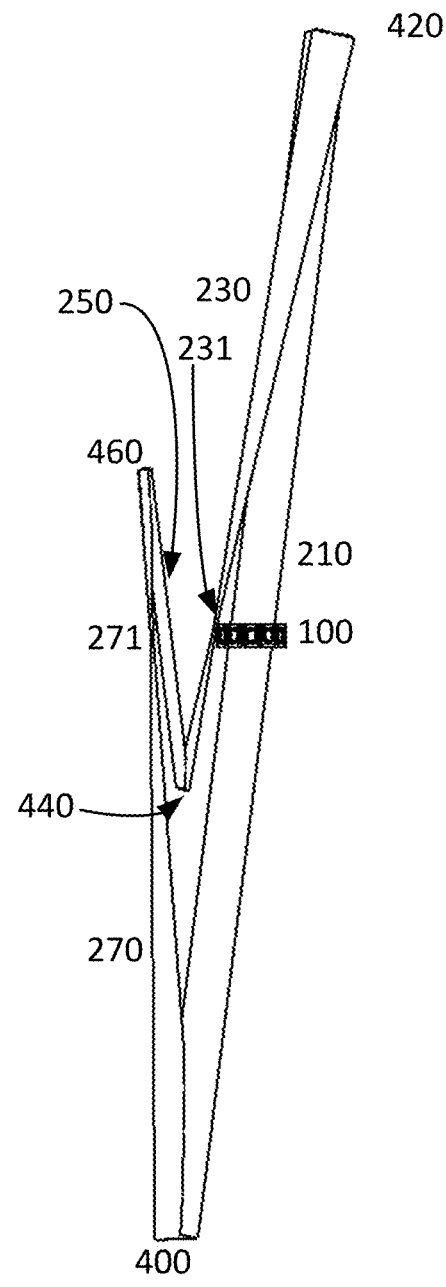
FIG. 4 illustrates an amplification pass of a toroidal beam path in accordance with an embodiment of the present disclosure.

In some embodiments, the closed circuit passes several times through the amplifier, each time along a slightly different direction, such that the path resembles the winding pattern of a toroid, passing through the center several times and following individual paths around the outside. Consider the embodiment depicted in FIG. 3. Beam path 200 is directed to pass multiple times through amplifier region 100, indexing azimuthally with each pass, until encountering an output coupler (not shown) which separates a central portion for recirculation from an outer portion to serve as an exit beam. A more detailed view of a single loop of the beam path is depicted in FIG. 4. A large, collimated resonator beam 210 passes through the amplifier 100 and encounters large focusing mirror 420. The reflected beam 230 passes through a focus 231 and then encounters small focusing mirror 440. The reflected beam propagates collimated along a path 250 that encounters small focusing mirror 460. The reflected beam 270 converges toward a focus 271, thereafter diverging to encounter primary high-reflectivity mirror 400, which directs the large, collimated beam again through the amplifier. In a ring geometry, the optical axes of all path segments may lie in a plane. In a toroidal geometry, however, two or more of the reflective elements are disposed at an out-of-plane angle, which serve to advance the beam plane in the azimuth by an amount that is $2\pi$ divided by an even integer. Consider again FIG. 3 which depicts multiple instances of beam segments similar to FIG. 4. In this embodiment, the number of azimuthal pump/beam regions of the amplifier is twelve and the number of instances of the beam paths is twelve, with the beam also taking twelve passes through the amplifier, each at a slight angle. After twelve amplifications an output coupler assembly separates and magnifies the inner portion inside a perimeter. Refer to FIG. 2, where a particular embodiment of an output coupler 480 utilizes the inner reflective portion 481 for deflecting the resonator-beam portion 280 from the outer output-beam portion 290, separated by a beam-defining perimeter 482. The resonator beam portion is then deflected azimuthally along a path to the amplifier for its first of twelve amplifications.

Figure 5:
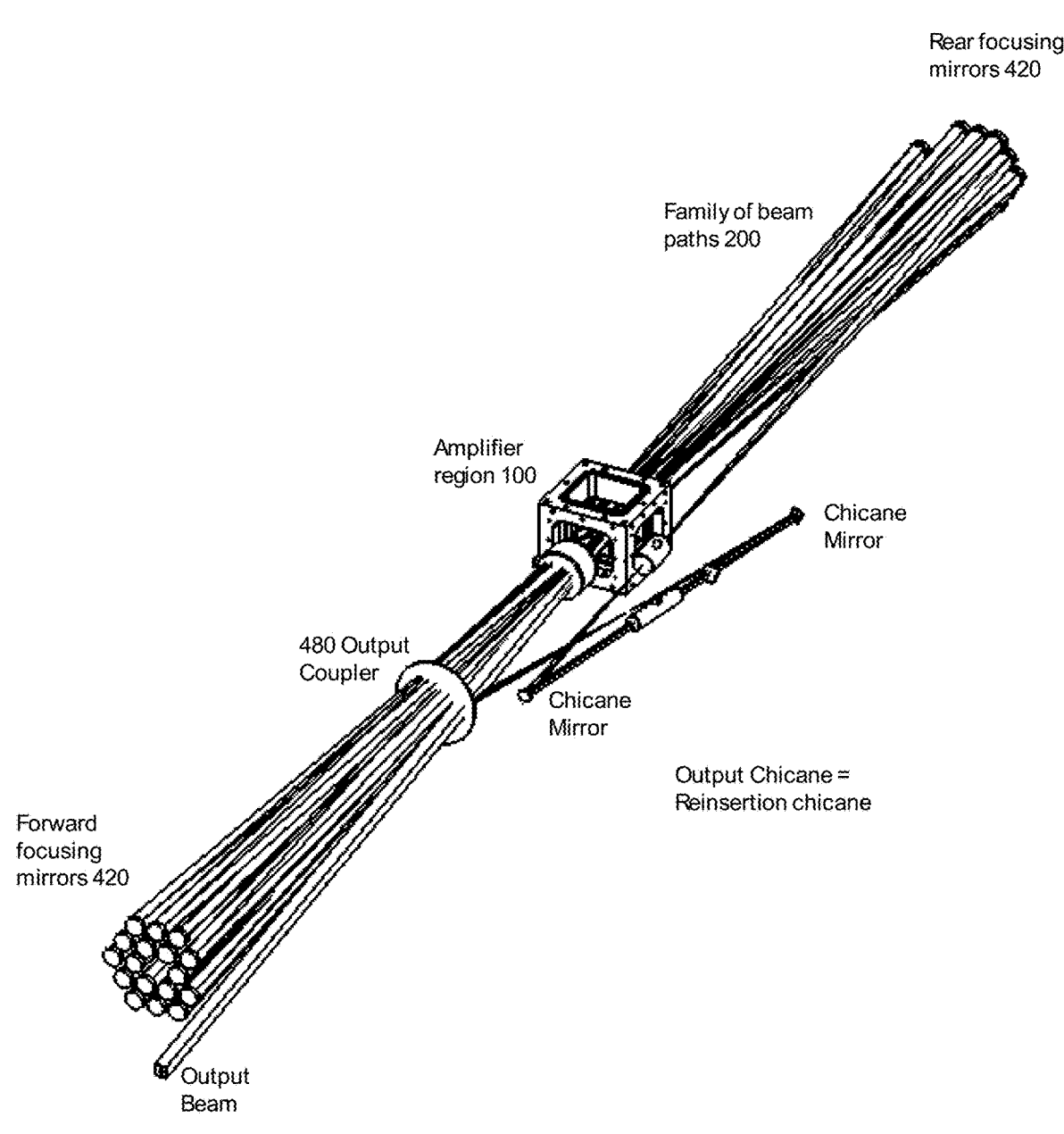
FIG. 5 illustrates an unstable resonator that incorporates several amplification passes of a folded beam path leading to an output coupler, an output beam, and a portion of the beam directed to a recycling chicane, including mirrors for magnification and reinsertion, for continued amplification in accordance with an embodiment of the present disclosure.

In some embodiments, the closed circuit passes several times back and forth through the amplifier, each time along a slightly different direction, such that the path is folded. Consider the embodiment depicted in FIG. 5. Beam path 200 is directed to pass back and forth through amplifier region 100. With the forward focusing mirrors and rear focusing mirrors having a focal length and a separation distance from one another equal to the sum of their focal lengths, they form a parallel beam along the forward direction while coming to a focus along its return path. During a final forward path and after traversing the amplifier, the beam encounters an output coupler, which separates a central portion for recirculation from an outer portion to serve as an exit beam.

A more detailed view of a portion of the beam path is depicted in FIG. 6. After passing many times through the amplifier, a final full-size, collimated resonator beam 210 passes through the amplifier 100 and encounters the output coupler 480. The inner portion is deflected from reflective portion 481 towards a focus 231. A saturable absorber is disposed at that focus, which is substantially transparent for the returning focused beam, but would attenuate a forward parallel beam. The beam is then deflected forward, collimated, and partly magnified by a chicane mirror. Disposed along its path is a quarter-waveplate with a 450 rotated orientation, a plane polarizing splitter, and another quarter-waveplate with the opposite 450 rotation. In some embodiments, along this parallel forward beam, a vapor cell is disposed immersed in a transverse magnetic field to serve as a beam shutter for the pulsed beam. The collimated beam then reflects off a second chicane mirror towards a focus, such that it becomes magnified and reinserted into the folded amplification path. Note that in some embodiments, a vapor cell is disposed immersed in a transverse magnetic field adjacent to the amplifier region along the several paths of the folded beam to serve as a beam shutter for the pulsed beam.

Rastering: In accordance with an embodiment of the disclosed method, the transmitting laser beam is moved along a path in space at a linear velocity in the orbit field that is faster than the orbital velocity of sought objects, but slow enough to provide sufficient signal in the observing telescope for detection if an object is traversed by the beam. In some embodiments, the path constitutes a raster pattern that lies fully within the camera of the observing telescope. In some embodiments, the observing telescope has: (1) an image plane camera that can measure the two-dimensional coordinates of a flash; and (2) an instrument such as a photomultiplier or avalanche photo-diode array that can measure the time that a flash occurs. In some embodiments, a single imaging array may perform both functions. The correlation between the two-dimensional position of the flash and the flash time determines when the laser beam left the transmitting telescope, thereby providing the third dimension of the object by the beam transit time.

Beam motion is accomplished by altering the angle of one or more mirrored elements. It can be appreciated that smaller elements have lower mass and lower moment of inertia and respond more quickly to the forces of actuators. In some embodiments, the fast actuator may be a one-dimensional or two-dimensional piezoelectric steering actuator. Rapid motion at high frequency is known to cause noise, which in some environments may be unwanted. Consequently, in some embodiments, the fast-actuators (and optionally the mirrored elements) may be sound-insulated. In some embodiments, that sound insulation may be enhanced by a vacuum-evacuated enclosure.

Rotating Raster Mirror(s): In some embodiments, rotational motion offers a preferred method of achieving fast motion of the illuminating laser beam. Consider one or more mirrors at the end of a rotating shaft having a normal which is not the axis of rotation. The axis of a beam reflected from such a rotating mirror will trace a circular path. In some embodiments, the reflective surface may be internal, by gluing together two wedged disks, so that the combined assembly is balanced. In some embodiments, one or more additional optical elements may be disposed in the optical path, causing a second motion at a slower speed to map out a two-dimensional area. Such an element can be either a canted rotating reflector not aligned with a rotational axis or translational oscillation.

In accordance with an embodiment of the disclosed method, one or more rastering mirrors are positioned close to the ocular element of a beam director telescope, such that the axis of the parallel beam is altered as it reaches the ocular element. In some embodiments, the ocular element may be a refracting lens or a reflecting mirror such as a paraboloid. In some embodiments, the ocular element also may be fitted with a motion device, such as a piezoelectric translation device, to alter the focus of the telescope and thereby change the size of the beam spot. In some embodiments, the beam is entering the beam director telescope following a Coudé path that directs the beam through the azimuthal and altitude axes of the telescope.

Figure 7:
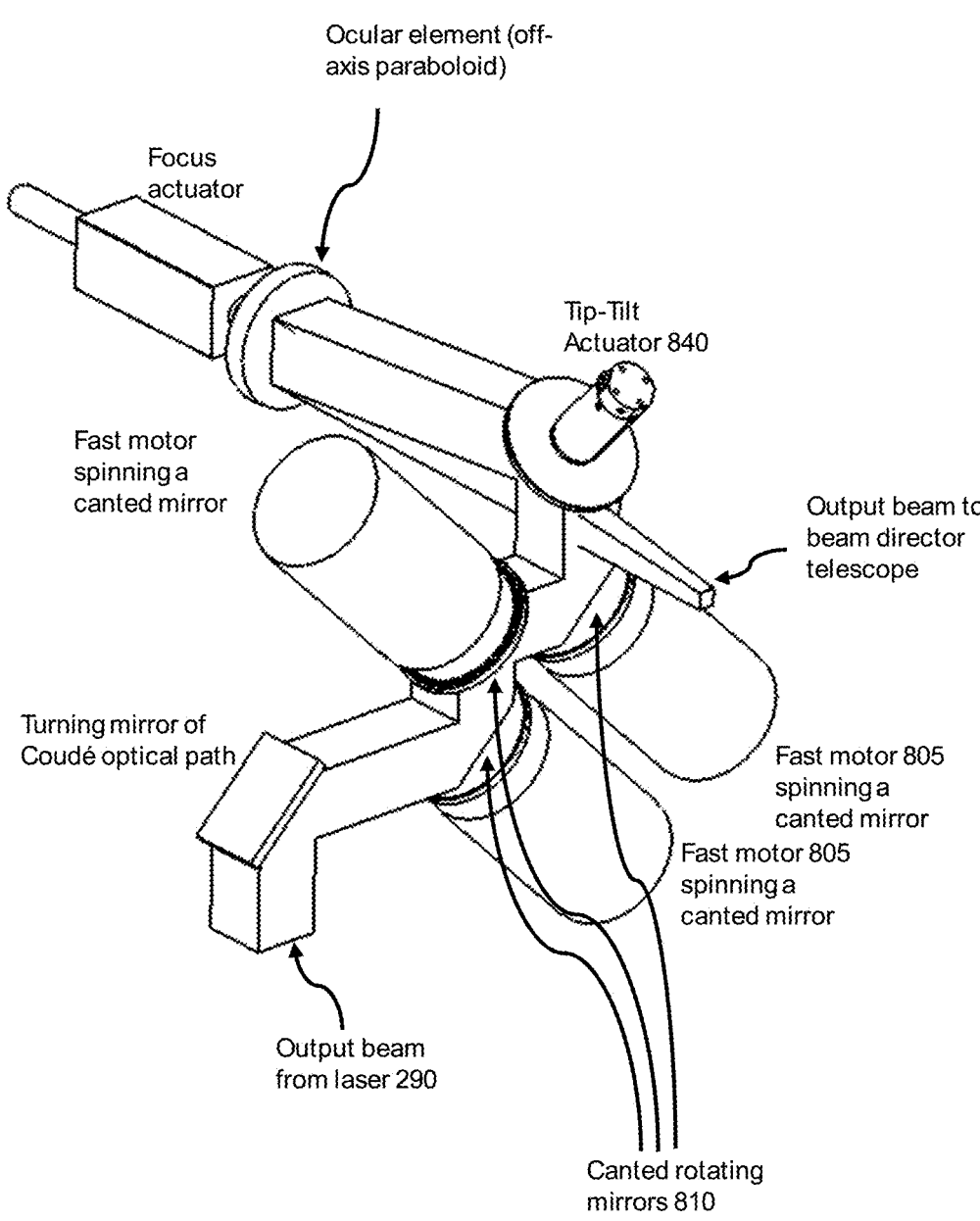
FIG. 7 illustrates a rastering system for delivering the beam to illuminate unique volumes of space in accordance with an embodiment of the present disclosure.

Consider the embodiment depicted in FIG. 7. The output beam for the laser 290 encounters one or more turning mirrors 801 which may be a component of a Coudé path to transport the beam to the ocular of the telescope through the azimuthal and altitude axes of the telescope gimbal. In some embodiments, a rotating canted mirror 810 is oriented to deflect the beam by slightly more or slightly less than 90°, depending on the rotation angle of the canted mirror. Reflections from two or more rotating canted mirrors can produce deflection angles that lie within an annular region. A tip-tilt actuator 840 can serve to relocate the central point of this annular region. A reflective ocular element of telescope 850 provides the intermediate focus, transporting the beam to the primary reflective element, and into space.

Figure 8:
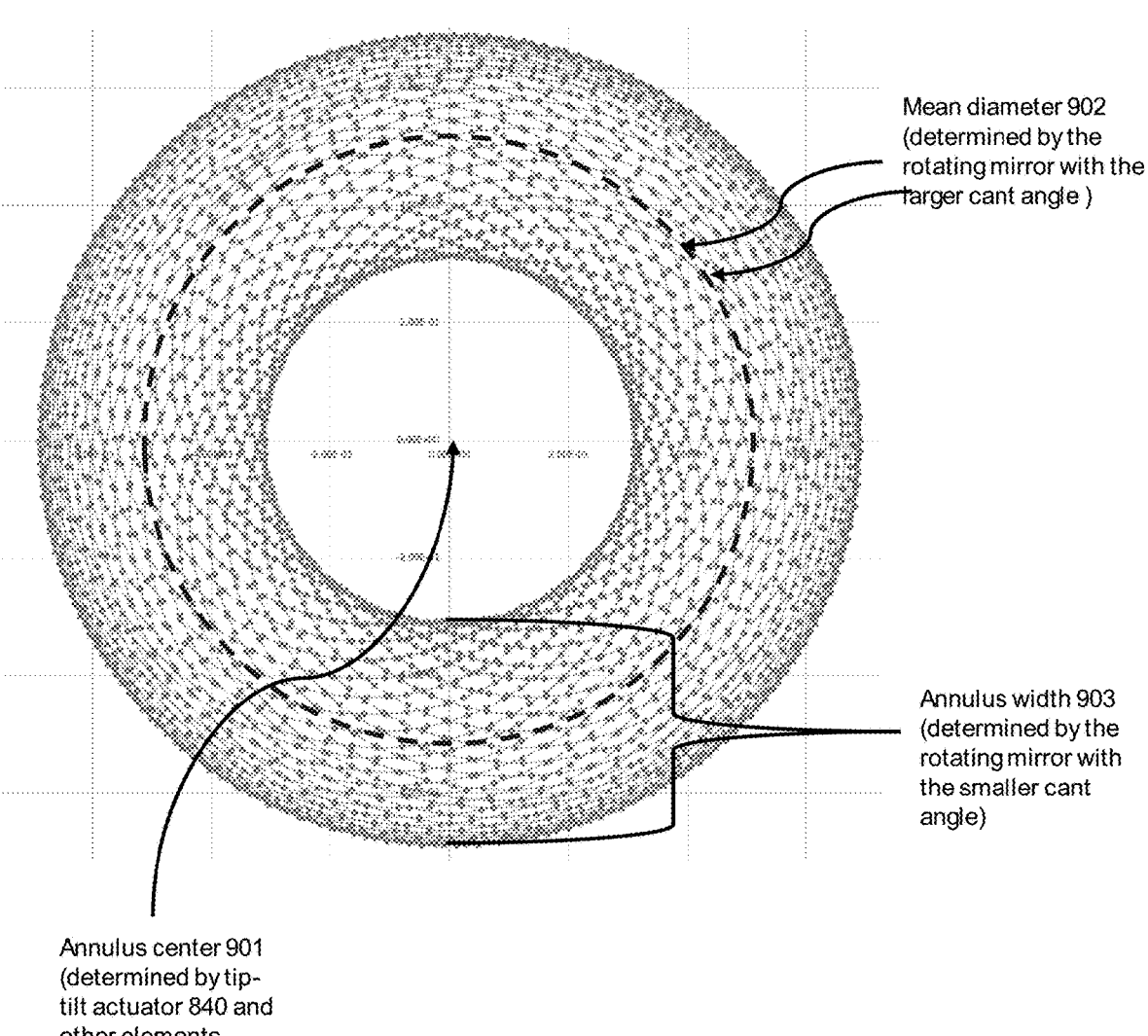
FIG. 8 illustrates an example geometry of a raster illumination pattern in accordance with an embodiment of the present disclosure.

Consider the embodiment of the rastering method in FIG. 8. Positioning of the telescope will orient the optics toward a region of space, with fine control determined by the x-y tip-tilt actuator, which may begin in a neutral position. A canted mirror with a larger deflection will define the mean diameter of the annulus 902. A canted mirror with a smaller deflection will define its width 903. If the annulus center requires relocation, for example to track an orbital object, the x-y tip-tilt actuator can accomplish this task until the object moves outside the field-of-view and the telescopes must be moved.

Consider the embodiment of the rastering methodology depicted in FIG. 9. Under certain circumstances, the raster elements will be optimized for searching for uncatalogued debris. During this period, the raster parameters are set to be optimized for this mode of operation. In particular, the orientation of the x-y tip-tilt stage is chosen in a neutral position, the raster motor driving a mirror with a large cant angle and a raster motor driving a mirror with a smaller cant angle are set to rotate at chosen frequencies, and the telescope ocular is positions for an optimal degree of defocus to maintain an optimal raster spot size. At some moment a flash is registered in one or more pixels of the sensor. This detection then defines a transition to a "tracking" strategy that is optimized to register a second flash. During the "tracking" phase, the ocular position may be shifted to an alternate amount of defocus, the x-y angles of the tip-tilt stage may be altered to center the flash, and other parameters may be altered to maximize likelihood of successful tracking. Searching for a second flash will continue either until it succeeds or categorized as unlikely and abandoned. Once a second flash is recorded, the orbit parameters can be calculated and a covariance ellipsoid constructed to characterize its uncertainty. With only two measurements that are closely spaced, its orbit will have a large uncertainty, requiring additional flashes. Those additional flashes can then be programmed, along with other priorities on the task list. In accordance with an embodiment of the disclosed method, the laser is pulsed at a rate that is higher than 1 kHz by mode-locking, Q-switching, or other means. In some embodiments, the pulse width is in the range of 1 ns or less. The time of the returning pulse relative to the time stream of the several outgoing pulses has a limited number of choices of precise transit times from the laser to the object and back. The discrete ambiguity is removed by moving the transmit beam with the raster to a distinct volume of space, defined both by its own beam diameter and by the pixel size in the observing telescope. Under these conditions, the spatial resolution of the observing telescope can provide a unique identity for the transmit pulse. Then, the observed transit time provides the range-to-target.

In accordance with an embodiment of the disclosed method, the laser power is increased beyond its nominal continuous power rating for a short period of time. To avoid damage, the laser power is reduced below its nominal continuous power for a separate, longer period of time, never exceeding the average power for a period that is longer than the thermal integration time of any sensitive internal laser component.

In accordance with an embodiment of the disclosed method, the transmitting laser wavelength is chosen within the exceedingly narrow bandpass of an optical filter such as an ALF based on Faraday anomalous dispersion (e.g., a FADOF). In some embodiments, the observing telescope is outfitted with such an ALF to improve the SNR of the observations.

In accordance with an embodiment of the disclosed apparatus, the laser beam output is formed by an unstable resonator surrounding a high-gain amplifier that has one or more small, low-mass reflector(s) after the output coupler that determine beam-pointing. In an embodiment, a set of high-frequency transducers, such as piezoelectric transducers, are provided to redirect beam-pointing along a fast-raster path. In another embodiment, rotating canted mirrors redirect the beam path along a circular fast-raster path. In a preferred embodiment, a number of both kinds of raster elements are employed. In a preferred embodiment, the laser is an alkali vapor laser.

In accordance with an embodiment of the disclosed apparatus, the laser beam output is formed by an unstable ring resonator with a high-gain amplifier insertion. Along the return path is inserted a sequence of elements for effectuating a first polarization rotating, a polarization cleaning, and a second polarization rotating, such as a first Pockels cell, a Brewster plate, and a second Pockels cell (with reversed orientation). By changing the quarter-wave Pockels cells' polarities between plus-minus and minus-plus, the two circular polarizations are obtained. In a preferred embodiment, the laser amplifier is an alkali vapor laser amplifier.

In accordance with an embodiment of the disclosed apparatus, the laser beam output is formed by an unstable ring resonator with a high-gain amplifier insertion. Along the path is inserted a saturable absorber, causing the beam to become mode-locked. One or more pulses can be formed, where the temporal structure of the beam has the repetition rate of the ring transit. In a preferred embodiment, the laser amplifier is an alkali vapor laser amplifier, and the saturable absorber is an alkali vapor cell with a pressure of quenching gas such as nitrogen.

In accordance with an embodiment of the disclosed apparatus, an apparatus for altering the quality-factor of the resonator is provided. In an embodiment, the Q-switching is accomplished with a Pockels cell for changing the beam polarization and a polarizer that alters the Q by variously allowing the polarization modified by the Pockels cell to pass through or to be deflected. In a preferred embodiment, the laser amplifier is an alkali vapor laser amplifier. In those embodiments, the Q-switching may be accomplished by a vapor cell with a pressure of nitrogen buffer gas in a static transverse magnetic field and a radiofrequency coil able to induce EPR. In those embodiments, additional elements such as one or more Pockels cells and or static elements, such as polarizers, may be used to select which choice of beam circular polarization is present in the EPR apparatus Q-switch. In some embodiments, one or more methods of pulse forming are utilized: Q-switching by Pockels cell(s), Q-switching by EPR resonance(s), and mode-locking may be employed at one or more locations in the resonator beam path.

In accordance with an embodiment of the disclosed method, the beam path may have a baseline longer than 4 m, so that a single back-and-forth transit of 8 m requires more than 26 ns, the natural lifetime of the lasing state. In these embodiments, the system can accommodate more than one pulse in the resonator, with spacing chosen such that they pass through the amplifier at uniform intervals, thereby converting the pump power to beam power. In these embodiments, the Q-switching device(s) provides additional intervals for beam pulses to form with a frequency that is some multiple of the beam path cycling frequency.

In accordance with an embodiment of the disclosed method, a property of the laser beam, such as its wavelength or polarization, is temporally modified, producing a bit stream embedded with a self-sequencing code. Observation and decoding a minimum set of bits will remove ambiguity of the bit stream's laser origin time, allowing decoding of transit time.

Illuminating Systems

DPAL is one of the few technologies believed to power-scale to power output levels of a megawatt or more. In some embodiments of this disclosure, the DPAL output power is 10 kW (up to 20 kW, 50 kW, or more), permitting a search time of a few years (depending on search scenario) for objects with $100 \text{ cm}^2$ area by illuminating $10 \text{ m}^2$ at $1,000 \text{ km}$ height with a pulse frequency of 500 ns to 5 µs. In some higher-power embodiments, the DPAL output power is 100 kW (up to 200 kW, 500 kW, or more), permitting a search time of a few years for objects with $10 \text{ cm}^2$ area. In very high-power embodiments, the DPAL output power is 1 MW (up to 2 MW, 5 MW, or more), permitting a search time of a few years for objects with $1 \text{ cm}^2$ area.

In some embodiments of the disclosed method, a boost mode is applied to raise the pulse energy for a short duration and subsequently reduce the pulse energy for a longer duration, to improve performance for that limited short duration. This may allow acquiring a flash on a smaller object immediately, at the expense of extending search time for covering a broad area.

DPAL Linear Architecture Variation: Prior disclosures taught a DPAL with a linear optical path, having an amplifier disposed to amplify the resonating beam propagating both forward and backward, and with an unstable resonator with high-reflectivity back mirror and an output coupler with a reflective and curved element near its center, to serve as the second optic of the resonator, and which was transparent near the perimeter, for the output beam to leave the laser.

Here, we disclose embodiments with an angled output coupler, such that the small confocal resonator element diverts the beam through a chicane of recycling mirrors to reinject a low-power replica of the beam for the next round of amplification.

We also disclose embodiments with an angled output coupler with inverted reflectivity, such that the beam portions incident on perimeter regions (i.e., further from the optical axis) are diverted to comprise the output beam and the central region is not reflective, allowing the resonator beam to pass through to encounter the small second confocal resonator element further downstream. By removing the output beam from the region surrounding the small confocal resonator element, one has greater access to mechanically tilt this low-mass confocal resonator element for the purpose of beam rastering. Fast-rastering may be facilitated by gaining mechanical and physical access to this low-mass element.

DPAL Ring Architecture: We disclose DPAL embodiments that comprise ring architectures. In one such embodiment, an output coupler allows the perimeter portion of the beam to pass through, while a central reflective confocal mirror deflects the beam to two or more recycling mirrors, for reinsertion in the amplification path. In another embodiment, an inverted reflectivity output coupler reflects the outer, perimeter portion of the beam to serve as the output and allows the central portion of the beam to propagate through to a reflective element. This element reflects the beam less than 180° (i.e., diverts it away from the optical axis). Two or more additional mirrors are disposed to form a closed path, such that the beam is returned to a back mirror, which collimates the beam and directs it into the amplifier. In some embodiments, one or more of these elements are curved, comprising focusing mirrors.

A confocal ring architecture has features which may be advantageous for this application. The multi-pass beam optics cause the beam to alternate between parallel regions and confocal regions. Focal waist regions for one of the circulation directions are parallel regions for the opposite circulation direction. Placement of a saturable absorber at a waist region will quench the counter-propagating beam. The resonator beam then propagates only in one direction throughout the entire path, providing access to focal waist regions where the beam is intense. Mode-locking strategies perform optimally when they utilize saturable absorbers disposed in such high-intensity regions. Polarization encoding strategies that utilize one or more Pockels cells also benefit from their placement near beam waists. The availability of additional reflective elements that can be chosen small allows separation of the two orthogonal raster elements, thereby reducing their mass and increasing their speed.

Pulse Control with EPR in the Output Chicane: The alkali atom, with one unpaired electron, can become polarized by illuminating with circularly polarized light that is resonant with the D1 transition. By applying a magnetic field, the two electronic states are split in energy. If the circularly polarized light is propagating along the magnetic field, the electron's spin-up (or spin-down) eigenstate can be driven to high levels of purity. If the magnetic field is oriented perpendicular to the propagation direction of the circularly polarized light, a mixture of eigenstates is produced, which precesses around the field direction.

In some embodiments, the resonator beam is made to be circularly polarized for a portion of its path. In some embodiments, this is accomplished by disposing a plane polarizer, a quarter wave plate with +450 orientation, and another quarter wave plate with −45° orientation within the ring. In these embodiments, a vapor cell can be immersed in a transverse magnetic field and disposed between the quarter wave plates where the beam is circularly polarized, thereby causing the vapor to become polarized and execute precession by EPR. In some embodiments, the beams passing through the amplifier and the exit beam are chosen to be circularly polarized, in which case the first quarter waveplate, the plane polarizer, the second quarter waveplate, and the EPR cell may be disposed sequentially in the output chicane. In some embodiments, the beams passing through the amplifier and the exit beam are linearly polarized, in which case the plane polarizer, the first quarter waveplate, the EPR cell, and the second quarter waveplate may be disposed sequentially in the output recycling chicane. In some embodiments, more than one EPR cell is disposed, each with a distinct magnetic field, such that the duration of their combined transparency is shortened.

Pulse Control with EPR in the Amplifier Path: In some embodiments, an EPR cell may be disposed in the resonator path in the vicinity of the amplifier. In these embodiments, the beam passing through the amplifier and the exit beam are circularly polarized. Note that the return beam will form a focus as it passes through the EPR cell and the amplifier in the opposite direction. In these embodiments, it may be preferred to position the EPR cell at the focus of the return beam, where the circular polarization of the beam will oppose the polarization of the vapor, the vapor therefore acting as a saturable absorber. In some embodiments, multiple EPR cells may be disposed, one in the resonator path in the vicinity of the amplifier and one or more in the circularly polarized portion of the output recycling chicane. In these embodiments, the sequence of quarter-wave, plane polarizer, and opposing quarter-wave are disposed elsewhere in the output chicane. These and other configurations will be apparent to those trained in the art.

Energy Storage with Multi-Pass Ring Architecture: In some embodiments, additional energy storage is desired to decrease the frequency of pulses and increase their intensity. While many lasers provide energy storage by increasing the occupation of the lasing state, this approach can become saturated when the lasing-state is short-lived, causing energy losses by spontaneous emission.

We teach a toroidal beam path that extracts energy from the atoms' lasing state while passing multiple times through the amplifier and stores this energy in one or more increasingly intense pulses circulating along a toroidal beam path. A collimated pulse of electromagnetic energy passes multiple times along slightly skewed angles through the amplifier while being redirected along an open ring. The geometry of the beam path is similar to a toroidal inductor winding. At the beginning of the path, a low-intensity beam pulse illuminates the amplifier, achieving gain. Along the separate turns of the toroidal path, each with its own reflectors, the pulse traverses through the amplifier and gains energy. At the end of the toroidal path, the outer portion of the beam is directed by an output coupler to an output beam, while a central portion of the beam is magnified and redirected to begin again along the winding toroidal path.

We also teach a folded beam path that extracts energy from the atoms' lasing state while passing multiple times through the amplifier and stores this energy in one or more increasingly intense pulses progressing along the folded beam path. One or more collimated pulses of electromagnetic energy pass multiple times along slightly skewed angles through the amplifier. The return path passes through a focus in or near the amplifier while being redirected to the next pair of mirrors. At the beginning of the path, a low-intensity collimated beam pulse delivered by the output chicane illuminates the amplifier, achieving gain. Along the separate passes of the folded path, each with its own reflectors, the pulse traverses through the amplifier several times and gains energy. At the end of the folded path, the outer portion of the beam is directed by an output coupler to an output beam, while a central portion of the beam is directed to an output chicane, where its polarization and temporal structure are imposed or refined, its size is magnified, and it is reinserted at the beginning of the folded path to begin again.

Rotating Raster Mirror(s): Rotational motion offers a method of achieving fast motion of the illuminating laser beam. Consider one or more mirrors, either planar or spherical, at the end of a rotating shaft having a normal that is not the axis of rotation. A beam reflected from such a rotating mirror will trace a circular path. One or more separate elements rotating at a slower speed can be employed to map out a two-dimensional area. Further beam control can utilize translational tip-tilt oscillation. In some embodiments, these elements are disposed along the beam path proximate to the ocular element of a telescope. In some embodiments, this beam path is a Coudé beam path that follows the altitude and azimuthal orientation axes, thereby allowing for telescope motion.

Saturable Absorber for Mode-Locking: A saturable absorber can achieve mode-locking by absorbing proportionately more power when the beam has lower intensity and becomes nearly transparent for periods with higher intensity. Such properties are achievable with a cell including a vapor of the lasing species with a quencher that returns the system to its ground state. For alkali metal vapors, gas quenchers such as nitrogen gas can be utilized to return excited alkali atoms to their ground state.

A cell containing a sample of the alkali metal is filled with a pressure of nitrogen gas. The pressure is calculated based on the efficiency of the quenching process and the desired response time of the saturable absorber. The desired pulse length of mode locking is determined by this quenching time and should be matched to the cell thickness and the amplifier bandwidth. For a 2-pm bandwidth, a pulse length of 0.5 ns is achievable with a cell less than 15 cm in length (corresponding to the speed of light for 0.5 ns (and a nitrogen pressure of 0.2 atm). The temperature of the cell will determine the rubidium density, which is tuned for optimal performance. In some embodiments, additional helium is added as a buffer gas for pressure broadening.

The cell is placed in the laser path where the intensity is greatest. For a ring laser, this would be along a return path at a point at or near a focus. Because ring lasers can support beams circulating in both the clockwise and counterclockwise senses, disposing the saturable absorber at a location that is a focus for one sense and a collimated full-size beam for the other sense, will quench the full-size beam, rendering the ring laser unidirectional.

Q-Switching: Q-switching can permit storage of energy in the lasing state and release it at a predetermined time by enhancing the gain in the cavity. In some embodiments, one or more active elements, such as a Pockels cell or acoustoelastic modulator, are disposed in the cavity, optionally with one or more polarizers. Using the active elements to variously orient the beam polarization perpendicular to the polarizers destroys the cavity gain, while alternating with orienting the beam polarization aligned with the polarizers allows gain in the cavity.

Q-Switching by EPR: For alkali atoms, EPR is a phenomenon that achieves gyromagnetic motion of alkali atoms immersed in a uniform magnetic field in resonance with an external RF field. For rubidium, the EPR resonance frequency varies linearly with magnetic field, as $4.67 \times 10^3$ MHz/T. Once the alkali atom's electrons become polarized, the cell can absorb circularly polarized beam photons only when the electronic polarization is anti-aligned with respect to the beam's circular polarization and becomes transparent when the electronic polarization of the alkali atoms is aligned with the beam polarization. The magnetic field should be chosen so that the resonant EPR frequency is equal to or is a chosen multiple of the beam path length. In some smaller-baseline embodiments, the time interval between passes through the amplifier is less than the pump saturation time or the spontaneous decay time, and a single pulse is resident in the ring. In these embodiments, an EPR positioned in the output reinjection chicane may have the frequency of the closed ring, and an EPR positioned adjacent to the amplifier should have the frequency of the single pass. In those embodiments, however, the EPR in the output chicane remains transparent for an extended period, reducing its effectiveness for defining the pulse time. As an alternative embodiment, when multiple EPR systems are disposed, they may be chosen to have frequencies that are incommensurate and higher than the frequency of the closed ring. In these embodiments, the time duration of transparency can be shorter. In some larger-baseline embodiments, the time interval between passes through the amplifier may approach the pump saturation time or the spontaneous decay time, reducing efficiency. In these embodiments, one or more EPR systems may be disposed and optionally tuned to incommensurate frequencies, so as to allow more than one pulse in the ring. In these embodiments, the number of passes of the resonator ring cavity and the incommensurate frequencies of the EPR can be chosen such that the separate pulses pass sequentially through the amplifier at uniform intervals so as to frequency and periodically transfer the pump energy into beam energy, thereby preserving efficiency.

In some embodiments, Q-switching with EPR can be used in combination with Q-switching by Pockels cell and mode-locking to synchronize the laser pulses with an external clock.

Transmission wavelength selection: DPAL optical pumping at the D2 wavelength populates the P3/2 second excited state, mixing of the P3/2 and P1/2 spin-orbit partners is facilitated by collisions with ethane or methane gas, and lasing from the P1/2 occurs at the wavelength of the D1 emission line, the first excited state of the alkali vapor atom. Gas collisions also broaden the linewidth and shift the wavelength of both the D2 absorption line and the D1 emission line. Greatest optical-optical efficiency is achieved if gas pressures can be kept low, and linewidths kept narrow Here, we disclose systems for wavelength-locking the D1 output transition of an alkali vapor laser. The ethane or methane gas, chosen for accelerating the mixing dynamics, also shifts the wavelength of the D1 transition towards longer wavelengths. For example, a choice of one-fifth of an atmosphere shifts the wavelength by approximately 5.4 GHz, 11 pm. This shift places the peak beam power outside the 2 GHz bandpass region of a FADOF ALF. In contrast, helium will broaden the absorption line and shift the wavelength toward shorter wavelengths. Adding helium pressure can restore the original transition energy, although at some loss of efficiency since the peak absorption cross section is reduced. The laser resonator naturally will resonate at the wavelength with the highest gain. Alternatively, inserting an absorber in the resonator whose wavelength of greatest transparency lies exactly in the region of the FADOF ALF can shift the beam output wavelength. Such an absorber may be a rubidium cell, with a sample of either 85-Rb, 87-Rb, or a natural mixture, with or without nitrogen gas, to serve as a wavelength lock. For DPALs based on the other alkali metals, cesium or potassium is used.

We disclose an absorptive cell for spectrally locking the beam efficiently to the desired wavelength. The vapor cell for mode-locking and the vapor cell for wavelength-locking perform different functions, and therefore have differences in optimizing their implementation. In preferred embodiments, the alkali vapor absorber for wavelength locking should not be saturable, therefore should have appreciable length and lower concentration, and should be located in the beam path in a region that is not focused so that it is less prone to saturation. Further, it is to be operated with no buffer pressure so that the bandpass region is nearly transparent.

Transmission Polarization Encoding: We disclose a series of components inserted into the resonator path of an alkali vapor laser for purposes of producing intervals of polarized output with control over transition times between the two polarizations. In some embodiments, those intervals of alternate polarizations comprise an embedded stream of information bits. In embodiments where the resonator is linear, insertion elements may include a Faraday rotator (for quarter-wave polarization rotation, reversing with propagation direction), a quarter waveplate (non-reversing), a Pockels cell (controllable plus-minus quarter wave), and a plane polarizer. In embodiments where the resonator forms a ring, insertion elements may include two Pockels cells with opposite quarter-wave rotations sandwiching a plane polarizer.

Quasi-CW Boost Mode: In some embodiments, power can be delivered to the diode stacks with time-dependent voltage and current, enabling a steep rise-time of the light output, a constant current above the nominal current for a short period, followed by a controlled shut-down for a cooling-off period. In some embodiments, a small capacitor is charged with a high voltage to deliver a predetermined amount of charge to overcome the impedance of the diodes. Once that capacitor is drained, a second capacitor with a preset charge delivers current for the remaining period. A coaxial shunt measures the current and maintains the desired value by feeding back a regulating signal to an FET.

In addition to pulsing the diodes above nominal current, operation of the DPAL in Quasi-CW boost mode also requires that the wavelength-locking of the pump laser's external cavity can provide locking at the higher power levels. Faraday effect rotation of the polarization near atomic lines, implemented in an external cavity, can provide feedback to the diodes, instantly locking their wavelength and narrowing their spectral output. Similarly, Kerr effect deflection of wavelengths near an atomic line, implemented in an external cavity, can provide feedback to the diodes, locking their wavelength and narrowing their spectrum. Once narrowband pumping begins, DPAL output immediately follows, initially with an unstable power output that stabilizes over time. With a saturable absorber insertion, the initial unstable behavior grows with time. Mode-locking will saturate within several beam passes.

Consequently, four requirements of Quasi-CW boost mode are met: (1) electronic pulse generation with rise time shorter than a half-microsecond followed by current-controlled output above nominal; (2) instantaneous wavelength-locking and spectral narrowing of the pump beam by Faraday or Kerr effect; (3) saturation of mode-locking in the output beam within a quarter-microsecond; and (4) thermal storage and averaging over tens of microseconds in small diode junctions.

Observing Systems

Observing Field of View, Aperture, Multi-Aperture, Guide-Star, Aberration Correction: We disclose an observing system that is matched to the disclosed method. One or more observing telescopes are configured to locate and track the region of sky that is illuminated by the laser. In embodiments that feature on the transmit side a fast-rastering system to move the beam, the observing system offers a field of view that encompasses the full region of the search and discovery raster plus any additional coverage in the field of view for relocating the center of the fast raster to acquire a second sighting event, providing the first tracking segment. Since a first sighting may appear at the edge or corner of a raster, warranting a relocation of the raster center by half of that largest rastering dimension, the field of view should be no less than twice the largest raster dimension.

Parallax: In some embodiments, the observing telescope is positioned a distance away from the beam-director telescope, defining a parallax coordinate, the x-y coordinate in the parallax direction, and one perpendicular to the parallax direction. Observation of a flash in the sensor will determine the perpendicular coordinate of the RSO and of the originating pulse, however the RSO's true position along the parallax coordinate will depend on its altitude. Raster pulses emitted within the past 7 ms with the observed value of the perpendicular coordinate should all be considered candidates for the originating pulse. Observation of a second flash will resolve the ambiguity.

The required observing telescope's aperture and field-of-view and the sensor's area determine its focal length and limiting angular resolution. If the imaging is diffraction limited, then the resolution can be as small as the diameter of the Airy disk in the focal plane. The spatial resolution of the sensor's pixels can contribute to the precision of the sighting event in the field. However, this precision also can be influenced by additional factors. Atmospheric turbulence leads to refractive distortions, such as star "twinkling." Phase corrections across the aperture can be made in real-time using adaptive optics, by iteratively sharpening the image of a nearby bright star. Since RSO search and discovery can choose any region of sky, this choice can be made often. When a bright star is not available, an artificial star can be provided by illuminating sodium atoms in the upper atmosphere with a resonant laser beam. If additional light collecting power is needed, but additional spatial resolution is not needed, it may be cost-effective to observe the illuminated sky-field with more than one telescope rather than increase the size of a single observing telescope.

Observing Disambiguation, Spatial and Time Resolution: Light detection and ranging (LIDAR) utilizes active illumination, usually with a laser beam, to determine the distance to an interception between the beam and the object in the field by measuring the transit time of light. In our system where the field is sparse with objects and the laser independently interrogates on the order of a million regions of space before a flash occurs, additional information is required to link the flash to the time of origination of the light beam. Some embodiments link the 2D position as viewed in the one or more high-resolution array in the focal plane of an observing telescope, to the 2D position within the fast raster pattern to determine when the laser light left the transmit telescope. In some embodiments one or more multi-pixel array of avalanche photodiodes (APD) in the focal plane of an observing telescope measures the time of the flash. In some embodiments, these detectors share the focal plane of a single observing telescope, with the incoming light partitioned between the two detectors. In some embodiments, the one or more high-resolution detector and the one or more multi-pixel APD are each in their own separate observing telescopes.

Timepix3 Imaging Sensor: In some embodiments, a sensor may be chosen that offers single-photon detection, nanosecond timing precision, and high resolution. The Timepix3 sensor was developed at the European Center for Nuclear Research (CERN) for digitizing light flashes in high-energy physics experiments. Improvements through three generations have improved the maturity of the chip and its coding library. Subsequent implementation for scientific cameras has butted four 256×256-pixel chips together into a single 512×512 array. For high-sensitivity applications, the camera sensor can be preceded by an image intensifier, which can amplify a signal as small as one or a few photons by a thousand-fold.

Observing Polarization Selection: In some embodiments, a polarizing beam-splitter is disposed before the focal plane, such that photons that are s-polarized are deflected and photons that are p-polarized are transmitted. This can be particularly useful if the transmitting laser is also plane-polarized. Background light is generally not fully polarized and will be split in both directions. If the laser light is fully polarized, then viewing only the polarization of the laser will improve SNR. Likewise, the other polarization will view only natural light, such as starlight, which could be useful for guiding adaptive optics. If imagers are placed in the focal planes along both s-polarized and p-polarized light directions, then an alternating sequence of polarizations transmitted by the laser will serve to confirm the timing of the laser emission that illuminated the object in the field. If the laser is circularly polarized, then a quarter waveplate will precede the plane polarizer(s) in the one or more observing telescopes. If the laser is emitting a sequence of different circular polarizations, then a quarter waveplate preceding the polarizer will allow decoding of the sequence.

Observing Wavelength Selection

We disclose one or more FADOF (filters) disposed in the focal plane of an observing telescope for discriminating light that was transmitted into space by the DPAL and reflected from orbiting debris and distinguishing it from sources of background light. In some embodiments, the observing optical path will incorporate an angled polarizing plate that separates parallel and sideways plane polarizations. In some embodiments, this separation will be preceded by a quarter waveplate to convert circular to plane polarization so that the separation sends incoming photons with right-circular polarization along a separate path from those with left-circular polarization. In embodiments that employ a single laser polarization, only one path requires a wavelength-selecting FADOF. In embodiments where the polarization of the laser changes pulse-by-pulse, the two separate paths are each provided with a FADOF, including a magnetic field and an alkali vapor cell containing one or more alkali species: 85-Rb, 87-Rb, cesium, or potassium. Following the vapor cell, another angled polarizing plate is disposed to separate photons with polarization that has been rotated by the Faraday effect, from photons with unrotated polarization. In some embodiments, four imagers are disposed at the imaging planes, one on each path from each of the two branches, providing images for left- and right-circular polarization for light that is wavelength-filtered at the picometer level and light that falls outside that narrow band. Daytime observing is likely to have sufficient SNR only for photons that meet the wavelength criterion, while nighttime observing can allow wider bandwidth, for example for objects with significant velocities along the line-of-sight.

Figure 10:
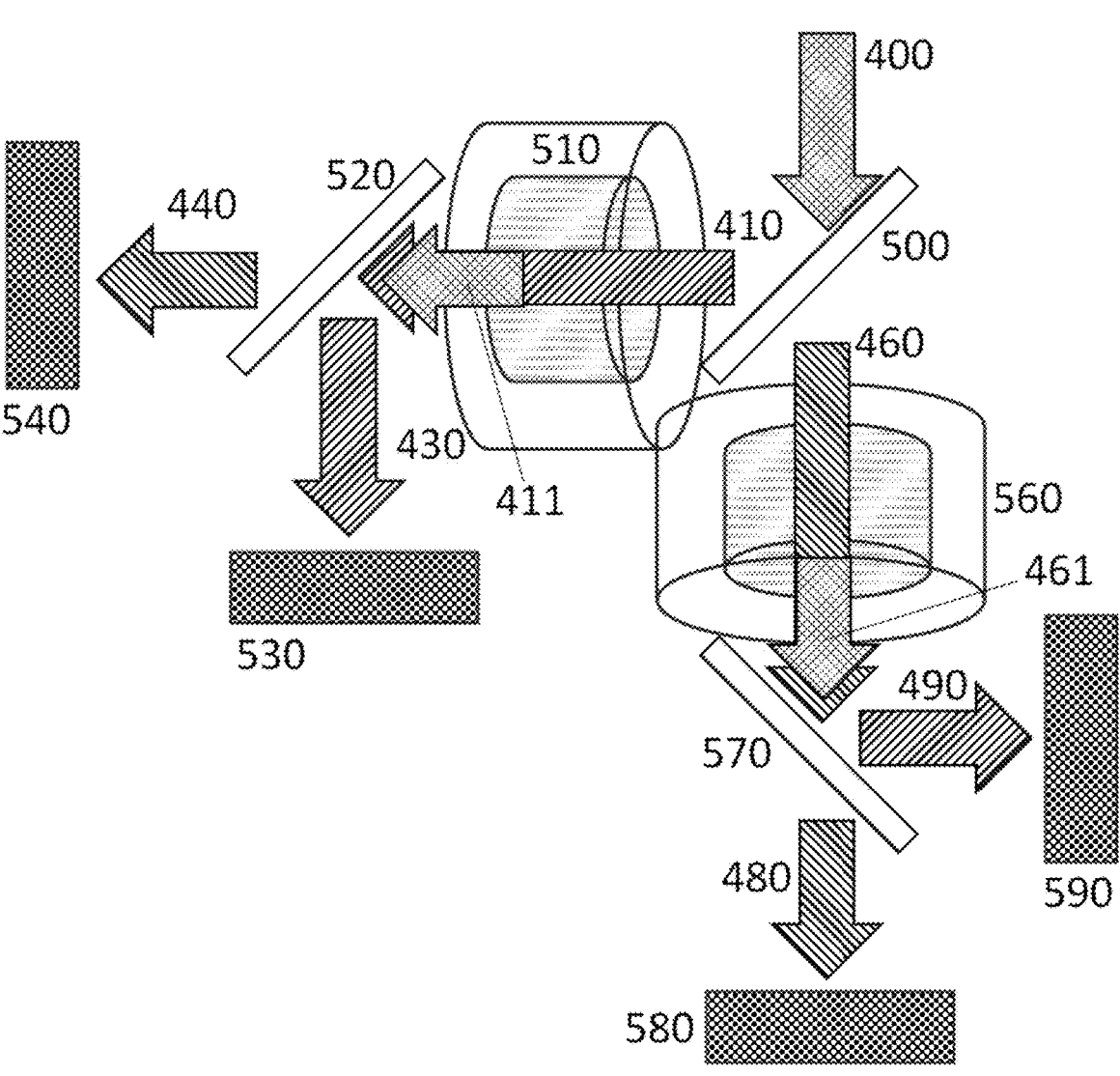
FIG. 10 illustrates an array of optical elements and multi-pixel sensors disposed in the focal plane of an observing telescope in accordance with an embodiment of the present disclosure.

In an example embodiment, an observing telescope may be configured for observing flashes with one or more Timepix sensors. In another embodiment, two telescopes are employed. One telescope may have four high-resolution two-dimensional imaging detector arrays, while the other may have four multi-pixel APD detectors. In either arrangement, the focal plane has a sequence of polarizing beam-splitters and Faraday cells arranged to beneficially split the photons by polarization and by wavelength. Consider FIG. 10, which shows an embodiment which accomplishes these objectives. Incoming light 400 of unknown wavelength and polarization is propagating towards the focal plane, prepared for imaging by telescope optics. The light first encounters polarizing beam splitter 500, which deflects s-polarized light 410 and transmits p-polarized light 460. Faraday cell 510 and an associated magnetic field solenoid are disposed in the beam-path of the s-polarized light. Some portion of light 411 may lie within the bandpass region of the Faraday cell, causing a rotation of the polarization of 90°. Polarizing beam-splitter 520 separates non-rotated p-polarized rays 430 from the rotated polarization, which is now s-polarized 440. Consequently, imager 540 receives photons that lie within the bandpass of the Faraday filter and were initially s-polarized, while imager 530 receives photons that did not lie within the Faraday filter bandpass and were originally s-polarized. Similarly, the p-polarized portion 460 of the incoming beam 400 is transmitted through polarizing beam splitter 500 and propagated through Faraday cell and magnetic field 560. A portion of the photons 461 have their polarization rotated. Impinging on polarizing beam-splitter 570, the portion that rotated into the s-polarization is reflected 490 towards an imager 590, while the unrotated p-polarization photons 480 which do not have wavelength within the Faraday bandpass are transmitted towards imager 580. Thus, imager 590 of the rotated light images photons that were originally p-polarized with wavelength within the bandpass, and imager 580 images photons that were originally p-polarized with wavelength outside that bandpass.

Airplane Eye Safety: In some embodiments, a halo of light naturally will propagate with the laser beam, to create a halo that may illuminate aircraft. In some embodiments, a diffusing element may be disposed in the illuminating beam such that a halo of light is created to propagate with the laser beam, to create a halo that may illuminate aircraft. In some embodiments, some central portion of laser light that is directed towards the tertiary reflector element of a Coudé path can be directed outside the primary telescope tube and into a separate telescope mounted to the tube to create a halo beam. In some embodiments, a separate spotting telescope is disposed, oriented to view the path of the illuminating halo laser as it propagates through the atmosphere at the elevation that may include airplane traffic. In some embodiments, a FADOF is disposed in the spotting scope, limiting its sensitivity to only reflections from the laser. In some embodiments, an APD is disposed in the focal plane of the spotting scope, so that a fast signal is produced that can respond within a microsecond to reduce illumination intensity to eye-safe levels or interrupt illumination.

Additional Considerations

The mode-locked DPAL TOF-LiDAR rests on four pairs of technological pillars, listed below in Table 2:

TABLE 2

1. Nanosecond timing:
a. Bright pulses can be produced by mode-locking the continuous beam into sub-nanosecond pulses that accumulate the energy.
b. A Timepix3 sensor can digitize 260k pixels with time-of-arrival precision of 1.5 ns.
2. Few picometer spectral linewidth:
a. The wavelength of the low-pressure DPAL laser's output is micro-tunable, and its bandwidth of a few picometers is extremely narrow.
b. Wavelengths other than that of the laser can be filtered from the viewing telescope, also by a FADOF bandpass a few picometers wide, allowing low-background daytime operation.
3. Pulse disambiguation:
a. Fast beam rastering can deliver sequential pulses to distinct regions of space.
b. The pixel that is triggered disambiguates which pulse caused the observed flash.
4. Dynamic range:
a. DPAL laser technology is widely believed to be power scalable to hundreds of kilowatts because higher overall output power reduces internal volumetric stressors. Output pulses as high as $10^{19}$ photons within 1 ns may be achievable.
b. An image intensifier can amplify pixel hits, allowing thresholds as low as a few photons.

Regarding at least some of the surveillance/discovery methods disclosed herein, one or more of the considerations in Table 3 below may be relevant:

atomic line filter's wavelength bandpass range at least partially overlaps with the alkali vapor laser's illumination wavelength spectral width. In some cases, the system further

TABLE 3

Laser with transmit telescope, receiving telescope, with interrogations faster than 1,000 per second
Laser with telescope, receiving telescope, with laser point slewing faster than orbital speed, such interrogations of empty space occur at a rate greater than what is achieved with the relative velocity between the object's orbital speed and the rotation of the Earth
Internal mirror motion within the laser cavity to increase raster speed
Laser pulsing (mode-locked, Q-switched, boosted, or in some combination) at a rate faster than the light transit time, i.e. from Earth, to space, and then returning to Earth
Laser brightness enhancement, taking advantage of energy in the atomic levels, by mode-locking
Utilizing one or more vapor cells with quenching gas as a saturable absorber in the laser cavity
Laser brightness enhancement, taking advantage of energy in the atomic levels, by Q-switching
Utilizing one or more Pockels cells with linear polarizers as a Q-switch at one or more focus points in the laser cavity
Utilizing one or more electron paramagnetic resonance (EPR) cells with a sequence of elements that prepares circular polarization as a Q-switch at one or more locations in the laser cavity
Laser brightness enhancement, taking advantage of thermal storage, by boosting the pump diode amperage in Quasi-CW mode
Utilizing one or more charged capacitors, field-effect transistors, and feedback from a zero-inductance current shunt, implemented in a circuit proximate to the pump laser diodes, to provide regulated current to the diodes in Quasi-CW mode above their nominal CW operating current for time periods less than 1 ms
Laser brightness enhancement, taking advantage of electromagnetic energy storage in the beam, by a toroidal path
A toroidal path for an unstable resonator, wherein the beam follows a distinct, circuitous path that passes more than once through the amplifier along the same general direction
Diode-pumped alkali laser (DPAL) with alkali vapor using one or more of potassium, cesium, rubidium-85, or rubidium-87
DPAL with intra-cavity absorber including a vapor cell containing at least one of the same species of alkali as the DPAL, to center the wavelength between the hyperfine-split ground-state levels
Observing telescope outfitted with Faraday anomalous dispersion optical filter (FADOF) to eliminate background light from other sources and allow selective sensitivity to wavelength of DPAL illumination Regarding tracking as disclosed herein, one or more of the considerations in Table 4 below may be relevant:

includes a telescope for collecting light reflected from objects that lie within that region of space. In some cases, the

TABLE 4

Laser with telescope, receiving telescope, with interrogations faster than 1,000 per second
Laser with telescope, receiving telescope, with laser point slewing faster than orbital speed, such interrogations of empty space occurring at a rate greater than what is achieved with the
relative velocity between the object's orbital speed and the rotation of the Earth. The observed two-dimensional location of any flash (due to overlap of the slewing laser and the orbiting object) on the observing side allows disambiguation of transit time.
Laser pulsing (mode-locked, Q-switched, boosted, or in some combination) at a rate faster than the light transit time, with laser point slewing, such that the observed two-dimensional location on the observing side allows disambiguation of transit time
Laser with telescope capable of encoding, receiving telescope capable of decoding
Self-synchronizing code
Mode-locking, switching at mode-locked rates
Tight rastering
Matching ultra-narrow linewidth for illumination laser and receiving telescope
Matching ultra-narrow linewidth for illumination laser and receiving telescope allowing day-time operation
DPAL and alkali absorber to lock illumination wavelength between alkali ground state hyperfine-split levels, and ultra-narrow linewidth FADOF installed in receiving telescope allowing day-time operation

FURTHER EXAMPLES

Example 1 is a system. The system includes a gas laser with an output wavelength and narrow spectral width to illuminate a region of space. The system further includes an alkali vapor atomic line filter with a wavelength bandpass range to utilize for viewing that region of space, wherein the system further includes a transmitting telescope for directing the laser beam into a region of space.

Example 2 is a system. The system includes a scanning laser with a focus velocity to illuminate a region of space. The system further includes an alkali vapor atomic line filter with a wavelength bandpass range to utilize for viewing that region of space, wherein the atomic line filter's wavelength bandpass range at least partially overlaps with the alkali vapor laser's illumination wavelength spectral width.

Example 3 is a system. The system includes a pulsed laser with a pulse frequency exceeding 10 kHz to illuminate a region of space. The system further includes an alkali vapor atomic line filter with a wavelength bandpass range to utilize for viewing that region of space, wherein the atomic line filter's wavelength bandpass range at least partially overlaps with the alkali vapor laser's illumination wavelength spectral width. In some cases, the system further includes laser pulsing at a rate faster than the light transmit time, with laser point slewing, such that the observed two-dimensional location on the observing side allows disambiguation of transit time.

Example 4 is a diode-pumped alkali laser (DPAL) system. The DPAL system includes one or more of potassium, cesium rubidium-85, or rubidium-87 as alkali vapor. The DPAL system further includes an intra-cavity absorber consisting of a vapor cell containing at least one of the same species of alkali as the DPAL, to center the wavelength between the hyperfine-split ground-state levels. The DPAL system further includes an observing telescope having a Faraday anomalous dispersion optical filter (FADOF) to eliminate background light from other sources, allowing selective sensitivity to the wavelength of DPAL illumination. In some cases, the DPAL system further includes a toroidal path for an unstable resonator wherein the beam follows a distinct, circuitous path that passes more than once through the amplifier along the same general direction. In some cases, the DPAL system further includes laser brightness enhancement by taking advantage of thermal storage, by boosting the pump diode amperage in the Quasi-CW mode. In some cases, the DPAL system further includes utilizing one or more charged capacitors, field-effect transistors, and feedback from a zero-inductance current shunt, implemented in a circuit in close proximity to the pump laser diodes, to provide regulated current to the diodes in Quasi-CW mode above their nominal CW operating current for time periods less than one millisecond. In some such instances, the DPAL system further includes a toroidal path for unstable resonator, wherein the toroidal path comprises a two-dimensional raster steering mirror and a polarization encoder.

Example 5 is a method for surveillance/discovery. The method includes employing a laser with a transmit telescope and a receiving telescope, with interrogations faster than 1,000 pers second. The method further includes utilizing a laser with a telescope and receiving telescope, with laser point slewing faster than orbital speed, such that interrogations of empty space occur at a rate greater than what is achieved with relative velocity between the object's orbital speed and the rotation of the Earth. The method further includes implementing an internal mirror motion within the laser cavity to increase raster speed. In some cases, the method further includes a pulsing laser at a rate faster than the light transmit time. In some cases, the method further includes laser brightness enhancement, takes advantage of energy in atomic levels, by mode-locking and Q-switching as well as takes advantage of thermal storage by boosting a pump diode amperage in Quasi-CW mode. In some cases, the method further includes one or more of the following being applicable: laser cavity utilizes one or more vapor cells with a quenching gas as a saturable absorber; electron paramagnetic resonance cells with a sequence of elements that prepares circular polarization as a Q-switch at one or more locations; and Pockels cells with linear polarizers as a Q-switch at one or more focus points.

Example 6 is a tracking system. The tracking system includes a gas laser with a narrow spectral width and output wavelength suitable for illuminating a region of space. The tracking system further includes a telescope and a receiving telescope, both coupled to the gas laser. The tracking system further includes interrogations at a rate faster than 1,000 per second. In some cases, the gas laser is configured for laser point slewing faster than orbital speed, ensuring interrogations of empty space occur at a rate greater than what is achieved with a relative velocity between an object's orbital speed and rotation of the Earth. In some such instances, an observed two-dimensional location of any flash on an observing side, due to an overlap of a slewing laser and an orbiting object, allows disambiguation of transit time. In some cases, the tracking system further includes: a laser with a telescope capable of encoding; a receiving telescope capable of decoding; utilizing a self-synchronizing code for encoding and decoding; and an ability to mode-lock and switch the mode-lock rates. In some such instances, the tracking system further includes a laser with a telescope capable of tight rastering. In some such instances, the tracking system further includes a receiving telescope with a matching ultra-narrow linewidth for illumination laser; and a receiving telescope with a matching ultra-narrow linewidth allowing for day-time operation. In some such instances, the tracking system further includes: a DPAL with an alkali absorber to lock illumination wavelength between alkali ground state hyperfine-split levels; and an ultra-narrow linewidth FADOF installed in a receiving telescope allowing for day-time operations.

Example 7 is an alkali laser configured for mode-locking in a linear geometry comprising a saturable absorber at the output coupler's return mirror and/or at a high-reflectivity mirror.

Example 8 is a system and method for steering an alkali laser in linear geometry. The method includes utilizing a return focusing mirror located behind or otherwise separate from an output-coupling mirror, the output coupling mirror having an anti-reflective (AR) or partially reflecting hole in the high-reflectivity coating.

Example 9 is an alkali laser in a ring geometry. In some cases, the alkali laser includes one or more of: a saturable absorber; a two-dimensional raster steering mirror; and a polarization encoder.

Example 10 is an alkali laser in a toroidal ring geometry. In some cases, the alkali laser includes one or more of: a saturable absorber; a two-dimensional raster steering mirror; and a polarization encoder.

Example 11 is a method using a self-synchronizing code to embed timestamp information in two alternating polarizations.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A system comprising:
   a laser configured to emit an output beam of locked wavelength and having a linewidth less than about 1 nm wide;

an output beam scanner configured to distribute illumination of the output beam over a region of space; and an observation side of the system comprising a sensor configured to collect and digitize reflected light;

wherein the laser is a diode-pumped alkali laser (DPAL) configured to utilize an alkali vapor comprising at least one of potassium, cesium, rubidium-85, and rubidium-87, wherein the DPAL is further configured for laser brightness enhancement by taking advantage of thermal storage by boosting a pump diode amperage in a quasi-continuous wave mode of operation.

2. The system of claim 1, wherein the observation side of the system at least one of:

is configured for selective sensitivity to the locked wavelength of the output beam;

is configured with a time digitizing capability; and further comprises at least one of:

at least one Faraday anomalous dispersion optical filter;

a photon intensifier configured to quantify weak reflection signals; and a plane polarizer configured to enhance a signal-to-noise ratio.

3. The system of claim 1, wherein the sensor comprises a plurality of pixels configured to distinguish between different orientations of a raster, thereby disambiguating an originating beam pulse for determining a unique transit time.

4. The system of claim 1, further comprising at least one sensor configured to quantify light that does not meet a polarization or wavelength bandpass criterion, to allow for at least one of:

detection of fast-approaching and/or fast-receding objects whose reflections may be Doppler-shifted; and detection of starlight for performing adaptive-optics corrections.

5. The system of claim 1, further comprising:

a telescope for collecting light reflected from an object located within the region of space; and a transmitting telescope configured for directing the output beam into the region of space.

6. A system comprising:

a pulsed laser configured to emit an output beam of locked wavelength and having a linewidth less than about 1 nm wide;

an output beam scanner configured to distribute illumination of the output beam over a region of space; and an observation side of the system comprising a sensor configured to collect and digitize reflected light;

wherein the pulsed laser is configured to pulse with an inter-pulse interval that is less than a light transit time, with sufficient laser axis slewing across a field-of-view during the inter-pulse interval such that a two-dimensional position of a flash observed by the sensor on the observing side of the system allows for disambiguation of transit time.

7. The system of claim 6, wherein the pulsed laser is a diode-pumped alkali laser (DPAL) configured to utilize an alkali vapor comprising at least one of potassium, cesium, rubidium-85, and rubidium-87.

8. The system of claim 7, wherein the DPAL comprises an intra-cavity absorber comprising a vapor cell containing the alkali vapor comprising the at least one of potassium, cesium, rubidium-85, and rubidium-87, wherein the intra-cavity absorber is configured to center the locked wavelength of the output beam between hyperfine-split ground-state levels.

9. The system of claim 6, wherein the pulsed laser has a pulse frequency of 10 kHz or greater.

10. The system of claim 6, wherein the pulsed laser comprises an unstable resonator configured to produce a resonator beam which follows a distinct, multi-segmental path that passes more than twice through an amplifier.

11. The system of claim 10, wherein the pulsed laser further comprises a plane polarizer disposed in the unstable resonator.

12. The system of claim 11, wherein the pulsed laser further comprises at least one of:

at least one active component configured to modulate a polarization of the resonator beam; and at least one passive component configured to alter the polarization of the resonator beam for a portion of its path in the unstable resonator.

13. The system of claim 12, wherein the at least one passive component comprises at least one quarter-wave-plate.

14. The system of claim 12, wherein the portion of the resonator beam path is substantially circularly polarized and at least one vapor cell is disposed in the path and immersed in a transverse magnetic field such that vapor atoms become polarized and precess about a magnetic field direction, executing electron paramagnetic resonance.

15. The system of claim 6, wherein the observation side of the system at least one of:

is configured for selective sensitivity to the locked wavelength of the output beam;

is configured with a time digitizing capability; and further comprises at least one of:

at least one Faraday anomalous dispersion optical filter;

a photon intensifier configured to quantify weak reflection signals; and a plane polarizer configured to enhance a signal-to-noise ratio.

16. The system of claim 6, wherein the sensor comprises a plurality of pixels configured to distinguish between different orientations of a raster, thereby disambiguating an originating beam pulse for determining a unique transit time.

17. The system of claim 6, further comprising at least one sensor configured to quantify light that does not meet a polarization or wavelength bandpass criterion, to allow for at least one of:

detection of fast-approaching and/or fast-receding objects whose reflections may be Doppler-shifted; and detection of starlight for performing adaptive-optics corrections.

18. The system of claim 6, further comprising:

a telescope for collecting light reflected from an object located within the region of space; and a transmitting telescope configured for directing the output beam into the region of space.

* * * * *